US011372527B2

(12) United States Patent (10) Patent No.: US 11,372,527 B2
Boyagian et al. (45) Date of Patent: Jun. 28, 2022

(54) DASH CARDS USER INTERFACE

(71) Applicant: FORD GLOBAL TECHNOLOGIES, LLC, Dearborn, MI (US)

(72) Inventors: Michael Boyagian, Wixom, MI (US); Peter Ruthenberg, Troy, MI (US); Paul Aldighieri, Grosse Pointe Farms, MI (US); Mohammad Kalash, Dearborn, MI (US); Husein Dakroub, Dearborn, MI (US); Thomas Madden, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 52 days.

(21) Appl. No.: 16/253,409

(22) Filed: Jan. 22, 2019

(65) Prior Publication Data

US 2020/0233567 A1 Jul. 23, 2020

(51) Int. Cl.
*G06F 3/04845* (2022.01)
*G06F 3/0482* (2013.01)
*G06F 3/04883* (2022.01)
*B60K 37/06* (2006.01)

(52) U.S. Cl.
CPC ........ *G06F 3/04845* (2013.01); *G06F 3/0482* (2013.01); *G06F 3/04883* (2013.01); *B60K 37/06* (2013.01); *B60K 2370/1438* (2019.05); *B60K 2370/52* (2019.05)

(58) Field of Classification Search
None
See application file for complete search history.

(56) References Cited

U.S. PATENT DOCUMENTS

| 5,608,898 | A | * | 3/1997 | Turpin | ................. G06F 40/174 |
| D454,574 | S | | 3/2002 | Wasko et al. | |
| D510,362 | S | | 10/2005 | Minawaga et al. | |
| D521,521 | S | | 5/2006 | Jewitt et al. | |
| D543,989 | S | | 6/2007 | Vigesaa | |

(Continued)

FOREIGN PATENT DOCUMENTS

| EP | 3324280 A1 | 5/2018 |
| EP | 3372436 A1 | 9/2018 |

OTHER PUBLICATIONS

Volvo Cars. "Volvo Concept Estate: User Interface" YouTube, published Feb. 27, 2014 (Retrieved from the internet Feb. 23, 2021) Internet URL: <https://www.youtube.com/watch?v=fLkNBvzxa9E> (Year: 2014).

*Primary Examiner* — Daniel Samwel
(74) *Attorney, Agent, or Firm* — Michael J. Spenner; Brooks Kushman P.C.

(57) ABSTRACT

A system for configuration of vehicle applications includes a display and a processor. The processor is programmed to provide, to the display, a user interface including an active application area configured to display an active application, and a dash card area adjacent the application area configured to display one or more dash cards, each dash card representative of a minimized application, responsive to a first selection of a resize control, increase a dimension of the active application area and decrease a dimension of the dash card area, and responsive to a second selection of the resize control, decrease the dimension of the active application area and increase the dimension of the dash card area.

24 Claims, 20 Drawing Sheets

(56) References Cited

U.S. PATENT DOCUMENTS

| | | |
|---|---|---|
| D543,990 S | 6/2007 | Vigesaa |
| D656,948 S | 4/2012 | Knudsen et al. |
| D674,400 S | 1/2013 | Fong et al. |
| D684,161 S | 6/2013 | Truelove et al. |
| 8,457,839 B2 | 6/2013 | Schneider et al. |
| D700,194 S | 2/2014 | Kim et al. |
| D726,213 S | 4/2015 | Milliotte et al. |
| D727,949 S | 4/2015 | Milliotte et al. |
| D729,259 S | 5/2015 | Chen et al. |
| D733,745 S | 7/2015 | Huang |
| D750,129 S | 2/2016 | Kwon |
| D750,655 S | 3/2016 | Kim et al. |
| D754,700 S | 4/2016 | Lee et al. |
| D755,215 S | 5/2016 | Lee et al. |
| D755,216 S | 5/2016 | Lee et al. |
| D756,370 S | 5/2016 | Arriola et al. |
| D757,070 S | 5/2016 | Dziuba |
| D770,474 S | 11/2016 | Loosli et al. |
| D772,918 S | 11/2016 | van den Berg et al. |
| D775,139 S | 12/2016 | Jones et al. |
| D779,534 S | 2/2017 | Harju et al. |
| D794,649 S | 8/2017 | Niijima et al. |
| D794,671 S | 8/2017 | Chaudhri |
| D817,976 S | 5/2018 | Shilwant et al. |
| D845,991 S | 4/2019 | Kessler et al. |
| D890,196 S | 7/2020 | Mathen et al. |
| D895,638 S | 9/2020 | van den Berg et al. |
| D911,356 S | 2/2021 | Varghese et al. |
| 2002/0093539 A1* | 7/2002 | Os .................. G06F 3/0482 715/810 |
| 2005/0132299 A1* | 6/2005 | Jones ............... G06F 3/0481 715/759 |
| 2010/0131877 A1* | 5/2010 | Dharwada ........ G06F 3/0481 715/765 |
| 2011/0309924 A1 | 12/2011 | Dybalski et al. |
| 2012/0013548 A1* | 1/2012 | Choi ................. B60K 35/00 345/173 |
| 2012/0054671 A1* | 3/2012 | Thompson ......... G06F 3/038 715/784 |
| 2014/0075394 A1* | 3/2014 | Nawle ............... G06F 3/017 715/863 |
| 2014/0096050 A1* | 4/2014 | Boblett ........... G01C 21/3697 715/769 |
| 2014/0109080 A1* | 4/2014 | Ricci ............... G06F 3/04886 717/174 |
| 2014/0189523 A1* | 7/2014 | Shuttleworth ... G06F 3/04817 715/741 |
| 2014/0267103 A1 | 9/2014 | Chaudhri |
| 2014/0351748 A1* | 11/2014 | Xia ................... G06F 3/0481 715/798 |
| 2015/0324067 A1 | 11/2015 | Cabral |
| 2016/0253049 A1* | 9/2016 | Wild ................. B60K 35/00 715/763 |
| 2017/0024106 A1* | 1/2017 | Wild ............... G06F 3/04847 |
| 2018/0081507 A1 | 3/2018 | Wengelnik et al. |
| 2018/0188950 A1* | 7/2018 | Choi ............... G06F 3/04886 |
| 2018/0329550 A1* | 11/2018 | Dellinger .......... G06F 3/0416 |
| 2019/0258335 A1 | 8/2019 | Beaumier et al. |
| 2020/0233567 A1 | 7/2020 | Boyagian et al. |
| 2020/0379715 A1 | 12/2020 | Won et al. |

* cited by examiner

DASH CARDS USER INTERFACE

TECHNICAL FIELD

Aspects of the disclosure generally relate to a customizable user interface for a vehicle having dash cards.

BACKGROUND

Many modern vehicles are equipped with electronic user interfaces. These interfaces show a set of vehicle information that may be displayed with a configurable digital readout or display panel. Due to the configurable nature of the digital displays, these user interfaces may be controlled by the user to display different elements of vehicle information.

SUMMARY

In a first illustrative embodiment, a system for configuration of vehicle applications includes a display and a processor. The processor is programmed to provide, to the display, a user interface including an active application area configured to display an active application, and a dash card area adjacent the application area configured to display one or more dash cards, each dash card representative of a minimized application, responsive to a first selection of a resize control, increase a dimension of the active application area and decrease a dimension of the dash card area, and responsive to a second selection of the resize control, decrease the dimension of the active application area and increase the dimension of the dash card area.

In a second illustrative embodiment, a method includes, responsive to a first selection of a resize control, increasing a dimension of an active application area configured to display an active application by an amount and decreasing the dimension of a dash card area adjacent the application area configured to display a sequence of dash cards each representative of a minimized application by the amount; and responsive to a second selection of the resize control, decreasing the dimension of the active application area by the amount and increasing the dimension of the dash card area by the amount.

In a third illustrative embodiment, a non-transitory computer-readable medium comprising instructions that, when executed by a processor of an information display system, cause the information display system to, responsive to a first selection of a resize control, increase height of an active application area configured to display an active application by a height amount and decrease height of a dash card area below the application area configured to display a sequence of dash cards each representative of a minimized application by the height amount; and responsive to a second selection of the resize control, decrease height of the active application area by the height amount and increase height of the dash card area by the height amount.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

An in-vehicle user interface may be configured to convey information relating to the operation of the vehicle to the driver. This information may be divided into various applications dedicated for different in-vehicle tasks, such as a phone application, a media playback application, a driving range application, etc. The user interface may provide a display structure to display these applications, including a status bar, an active application area, an area for dash cards, and persistent climate controls. A currently-active application is displayed in the active application area, while each set of dash cards represents a reduced view of a recently-used application. The status bar and persistent climate controls areas display always-available access to various features and information. Further aspects of the display of information in the user interface are discussed in further detail herein.

Figure 1:
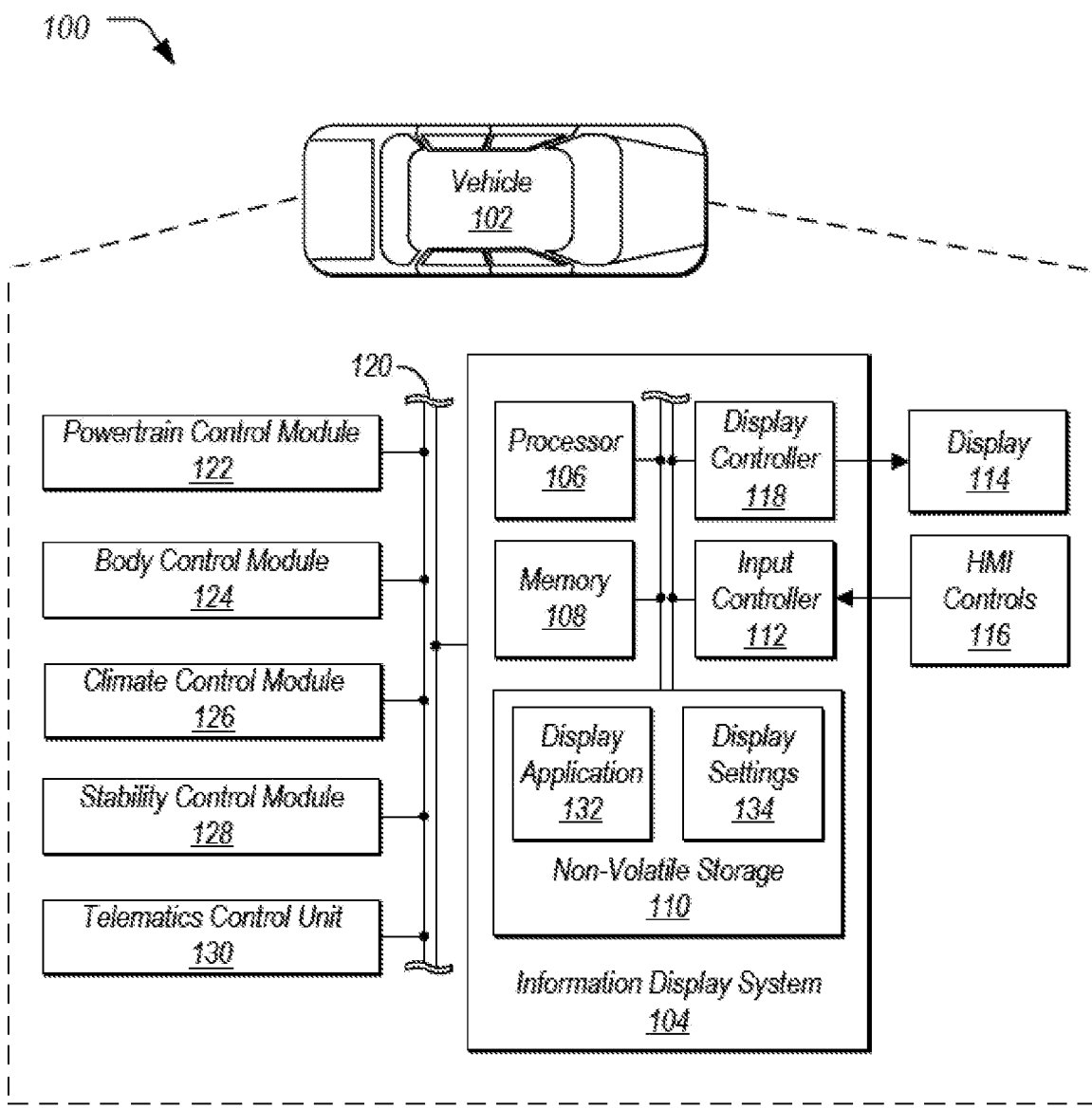
FIG. 1 illustrates an example of a vehicle including a configurable display to facilitate communication of information with a driver.

FIG. 1 illustrates an example 100 of a vehicle 102 including a configurable display 114 to facilitate communication of information with a driver. The vehicle 102 may include various types of passenger vehicle, such as crossover utility vehicle (CUV), sport utility vehicle (SUV), truck, recreational vehicle (RV), boat, plane or other mobile machine for transporting people or goods. In some cases, the vehicle 102 may be driven by a driver, while in other cases, the vehicle 102 may be semi-autonomous or even fully autonomous in its operation. It should be noted that the illustrated vehicle 102 is merely an example, and more, fewer, and/or differently located elements may be used.

An information display system 104 of the vehicle 102 may include one or more processors 106 configured to perform instructions, commands, and other routines in support of the processes described herein. For instance, the information display system 104 may be configured to execute instructions of a display application 132 loaded to a memory 108 to provide features such as media functions, climate functions, phone integration functions, as well as driving functions such as trip counters, fuel economy readings, fuel history information, engine information, and towing status. Such instructions and other data may be maintained in a non-volatile manner using a variety of types of computer-readable storage medium 110. The computer-readable medium 110 (also referred to as a processor-readable medium or storage) includes any non-transitory medium (e.g., a tangible medium) that participates in providing instructions or other data that may be read by the processor 106 of the information display system 104. Computer-executable instructions may be compiled or interpreted from computer programs created using a variety of programming languages and/or technologies, including, without limitation, and either alone or in combination, HTML 5, JAVA, C, C++, C#, OBJECTIVE C, FORTRAN, PASCAL, JAVA SCRIPT, PYTHON, PERL, and PL/SQL.

The information display system 104 may be provided with various features allowing the vehicle occupants to interface with the information display system 104. For example, the information display system 104 may include an input controller 112 configured to receive user input from one or more human-machine interface (HMI) controls 116 of the vehicle 102 providing for occupant-vehicle interaction. These may include one or more buttons, knobs, or other controls configured to invoke functions on the information display system 104. The information display system 104 may also drive or otherwise communicate with one or more configurable displays 114 configured to provide visual output to vehicle occupants by way of a display controller 118.

The HMI controls 116 may include touch capability of the configurable display 114. In addition, the HMI controls 116 may include one or more physical controls, such as a knob and/or physical buttons. The HMI controls 116 may also include voice commands in a grammar utilized by a voice recognition system of the vehicle 102.

Figure 2:
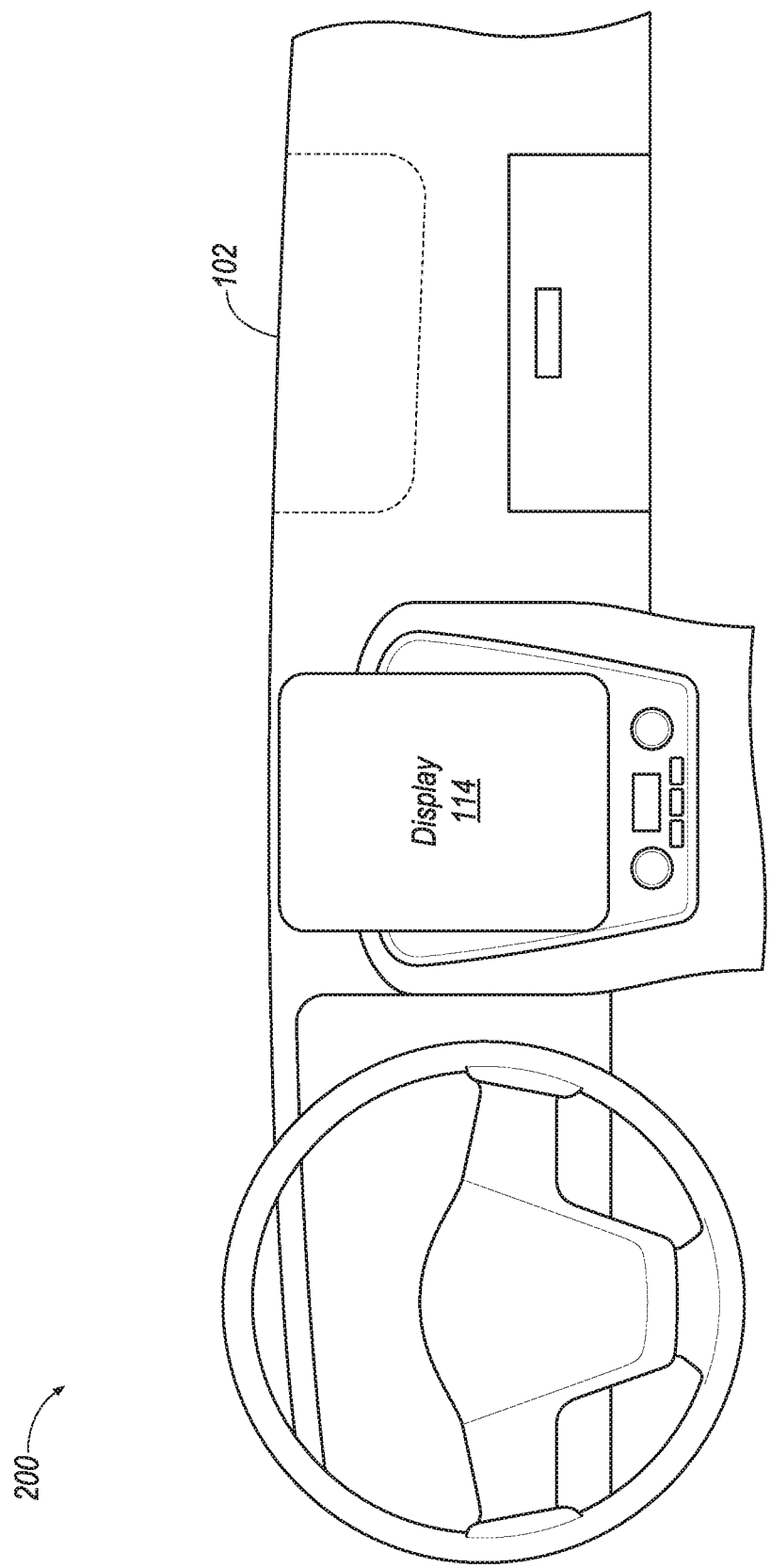
FIG. 2 illustrates an example portion of a vehicle including a configurable display disposed within a dashboard of the vehicle.

As shown in FIG. 2, the configurable display 114 may be disposed within a dashboard of the vehicle 102. In other examples, the configurable display 114 may be part of another display system, such as the navigation system, or may be part of a dedicated information display system elsewhere in the vehicle 102. The configurable display 114 may be a liquid crystal display (LCD), a plasma display, an organic light emitting display (OLED), or any other suitable display. In most cases, the configurable display 114 may be a touch screen that can receive user touch input via the display controller 118. It should be noted that while FIG. 2 shows the configurable display 114 in a vertical orientation, in other examples a horizontally oriented configurable display 114 may be utilized (e.g., to provide for horizontal layouts such as those shown in FIGS. 16-17).

Referring back to FIG. 1, the information display system 104 may be further configured to communicate with other components of the vehicle 102 via one or more in-vehicle buses 120. The in-vehicle buses 120 may include one or more of a vehicle controller area network (CAN), an Ethernet network, and a media-oriented system transfer (MOST), as some non-limiting possibilities. The in-vehicle buses 120 may allow the information display system 104 to communicate with other vehicle 102 systems. The exemplary vehicle systems described in detail below may communicate with the information display system 104 over an in-vehicle bus 120. In other examples, the information display system 104 may be connected to more or fewer in-vehicle buses 120, and one or more HMI controls 116 or other components may be connected to the information display system 104 via in-vehicle buses 120 or directly without connection to an in-vehicle bus 120.

In an example, a powertrain control module 122 may be a component in communication with the information display system 104, and may be configured to provide information to the information display system 104 regarding control of engine operating components (e.g., idle control, fuel delivery, emissions control, engine diagnostic codes, etc.). A body control module 124 may be configured to manage various power control functions such as exterior lighting, interior lighting, keyless entry, remote start, and provide information to the information display system 104 such as point of access status information (e.g., closure status of the hood, doors and/or trunk of the vehicle 102). A climate control module 126 may be configured to provide control and monitoring of heating and cooling system components, as well as to provide information to the information display system 104 regarding the components (e.g., compressor clutch and blower fan control, temperature sensor information, etc.). A stability control module 128 may be configured to perform functions such as active suspension control, traction control, and brake control, and provide sensed vehicle dynamics information to the information display system 104, such as roll angle, pitch angle, yaw rate, roll rate, pitch rate, lateral and longitudinal velocity, lateral and longitudinal acceleration, tire slip, tire slip rate, and an infotainment system module. A telematics control module 130 may include an in-vehicle modem configured to access communications services of a communications network (not shown), and may provide packet-switched network services (e.g., Internet access, voice over Internet protocol (VoIP) communication services) to the information display system 104 and to other devices connected over the in-vehicle bus 120.

A display application 132 may be installed to the information display system 104 and utilized to allow the vehicle 102 to provide output to the display controller 118, such that the configurable display 114 conveys the information relating to the operation of the vehicle 102 to the driver. This information may be divided into various applications dedicated for different in-vehicle tasks, such as a phone application, a media playback application, a driving range application, etc.

The display application 132 may be configured to provide a display structure to display these applications, including a status bar, an active application area, an area for dash cards, and persistent climate controls. As shown in greater detail below, a currently-active application is displayed in the active application area, while each of set of dash cards represents a reduced view of a recently-used application. The status bar and persistent climate controls areas display always-available access to various features and information.

Referring generally to FIGS. 3-17, the configurable display 114 is shown in greater detail in accordance with one or more aspects of the display application 132. As seen therein, the configurable display 114 may display one or more user interfaces that change to convey different information to the driver. To that end, the one or more user interfaces may be selectable upon receipt of driver or vehicle input to the information display system 104 from the HMI controls 116. While the illustrated user interfaces are displayed in a particular layout and language, it should be noted that different languages or layouts of content may be used. In an example, in some layouts climate controls may be omitted. In another example, the dash card layout may include a vertical listing of dash cards for a holozoans screen, as opposed to a horizontal listing of dash cards for a vertical screen.

Figure 3:
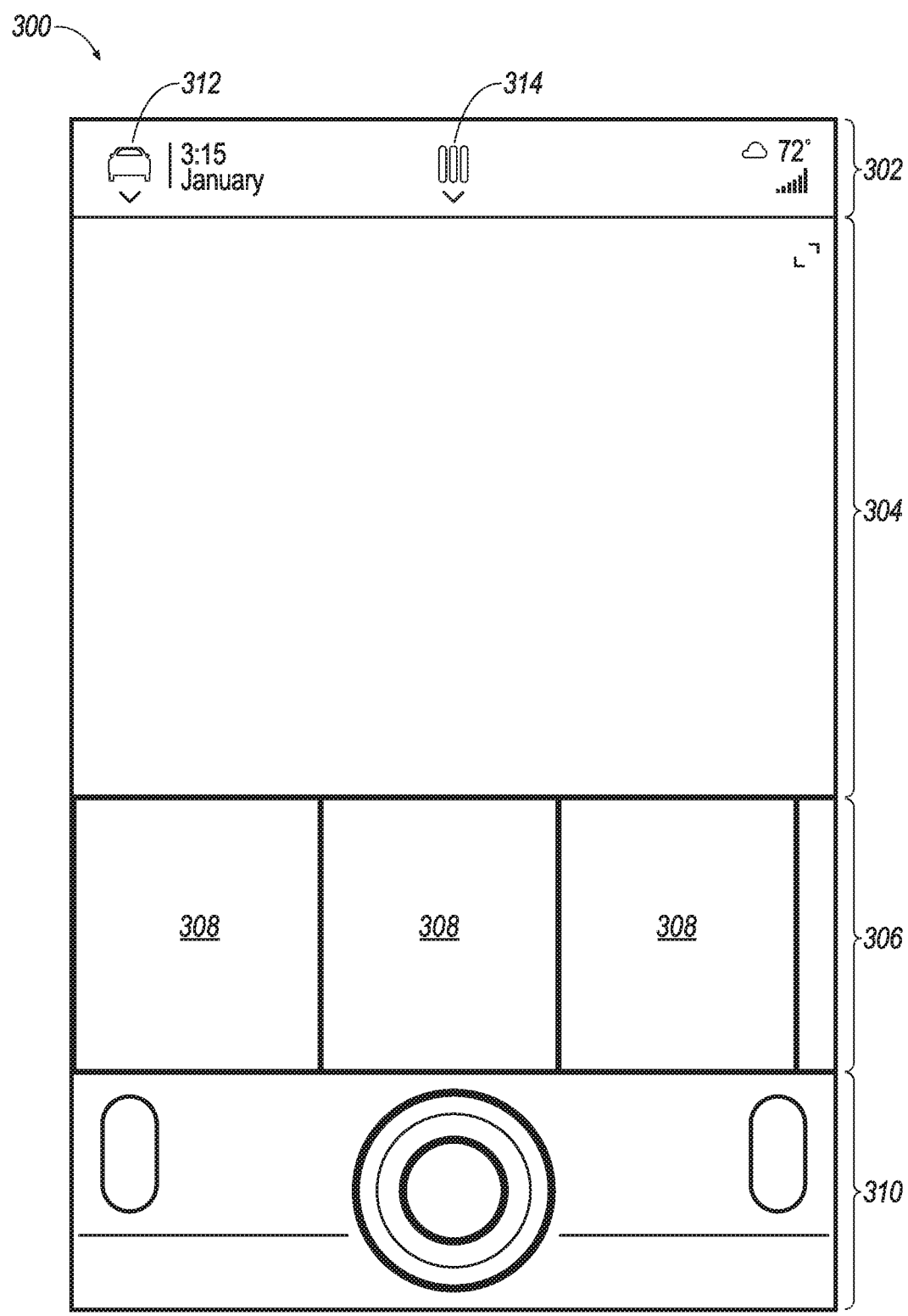
FIG. 3 illustrates an example user interface illustrating the general dash cards layout.

FIG. 3 illustrates an example user interface 300 illustrating the general dash cards layout. In an example, the user interface 300 may be presented by the display application 132 in the configurable display 114. As shown, the example user interface 300 generally includes four main areas: a status bar area 302, an active application area 304, a cards area 306, and a climate area 310. However, it should be noted that this is just one example. While the user interface 300 may include certain elements (e.g., status bar, active application, dash cards, and climate controls) in certain locations and orientations, it should be noted that these and other elements may be placed in different locations on the screen or not at all.

The status bar area 302 may provide access to all features and settings of the user interface 300 and may also provide high-level information. A quick controls/vehicle settings control 312 of the status bar area 302 may be selected to provide access to common vehicle 102 controls and vehicle 102 settings. A vehicle avatar control 314 may be selected to provide access to all of the vehicle 102 features (except climate control settings). In an example, the vehicle avatar control 314 may be rendered as an avatar of the vehicle 102.

The active application area 304 may be an area of the user interface 300 in which the currently active features for a specific application are displayed, providing access to the features of that application.

The cards area 306 may include a sequence of cards 308 which are designed to give quick access to recently used applications and actions. The climate area 310 may provide persistent screen space for primary climate controls.

Figure 4:
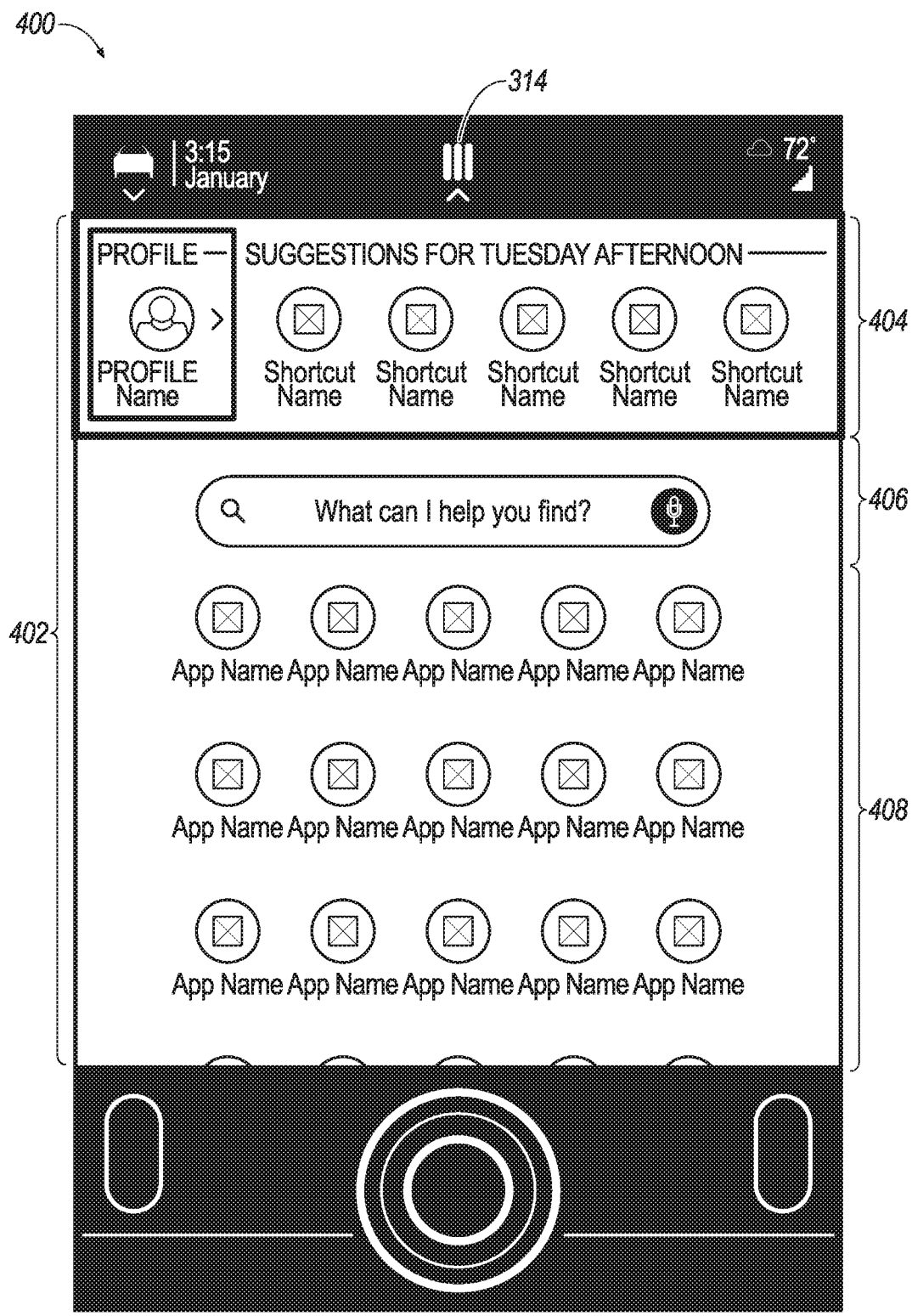
FIG. 4 illustrates an example user illustrating options provided responsive to selection of the vehicle avatar control.

FIG. 4 illustrates an example user interface 400 illustrating options 402 provided responsive to selection of the vehicle avatar control 314. The options 402 may include a profile section 404, a global search section 406, and an application drawer section 408. The profile section 404 may be displayed as an overlay over other user interface elements, and may include a user profile (e.g., an image and name corresponding to the user profile) and a set of smart dynamic shortcuts to relevant applications, quick actions, or features. The suggestions (e.g., the smart dynamic shortcuts) may use machine learning, location, time of day, calendar events, and other available data to predict users upcoming interaction with the system. Examples of such short cuts may include (i) launching an app audio app to a specific station, (ii) calling a contact without launching active app (quick action), (iii) launching a navigation app with a destination preloaded, and/or (iv) ordering a drink from a retail app without launching (quick action). The global search section 406 includes a search control that allows a user to search the entire system from a single location. The application drawer section 408 provides access to the applications that are available for use on the system.

Figure 5:
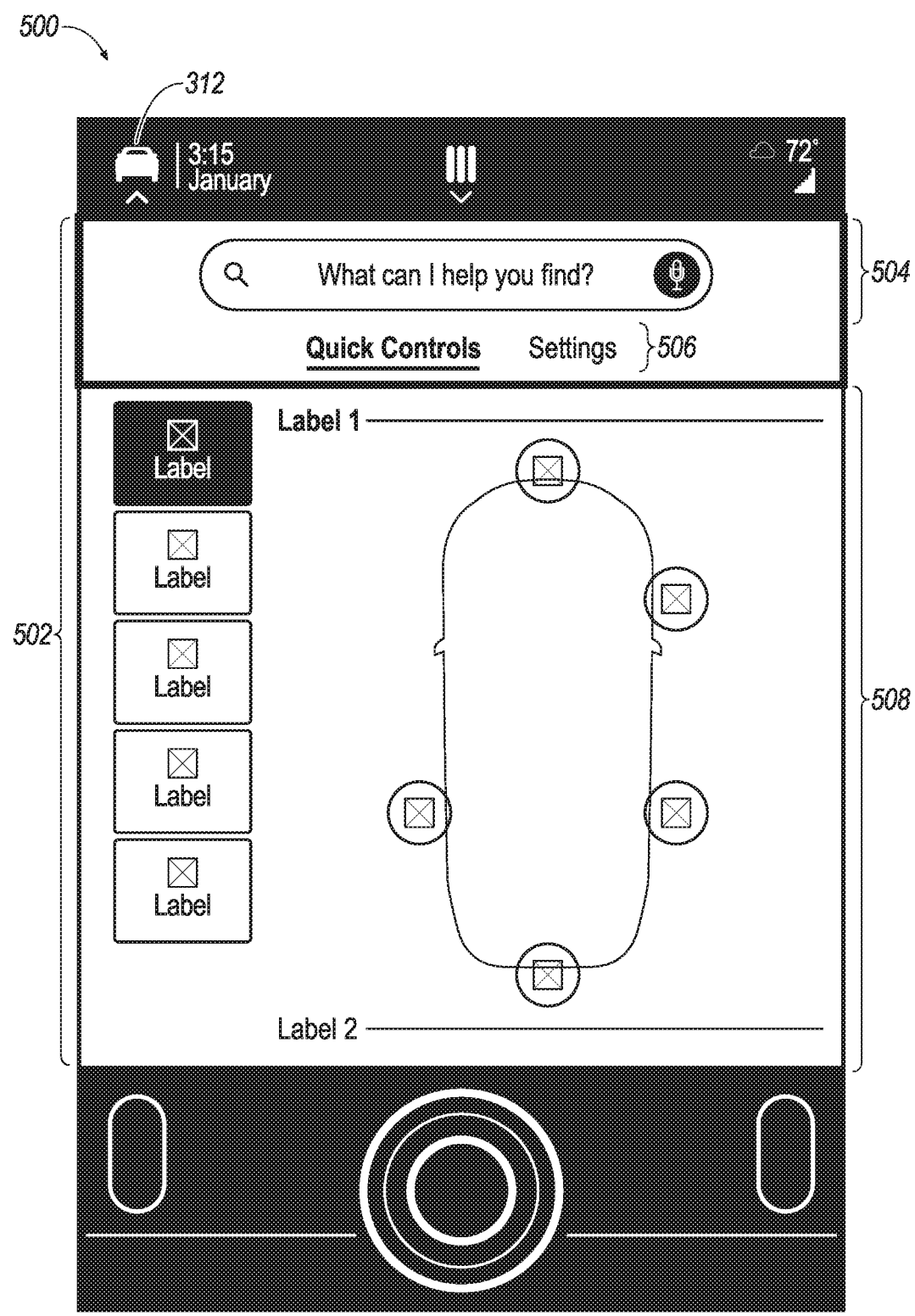
FIG. 5 illustrates an example user interface illustrating options provided responsive to selection of the quick controls/vehicle settings control.

FIG. 5 illustrates an example user interface 500 illustrating options 502 provided responsive to selection of the quick controls/vehicle settings control 312. The options 502 may include a global search section 504, a quick controls/settings selector control 506, and a display section 508 for providing information based on whether the quick controls/settings selector control 506 is set to quick controls or settings. Similar to the global search section 406 included on the user interface 400, the global search section 504 also allows for search of applications and features of the system from a single location. As shown, the quick controls/settings selector control 506 is set to quick controls. As the quick controls are selected, the display section 508 provides the user with quick access to vehicle controls that are frequently used.

Figure 6:
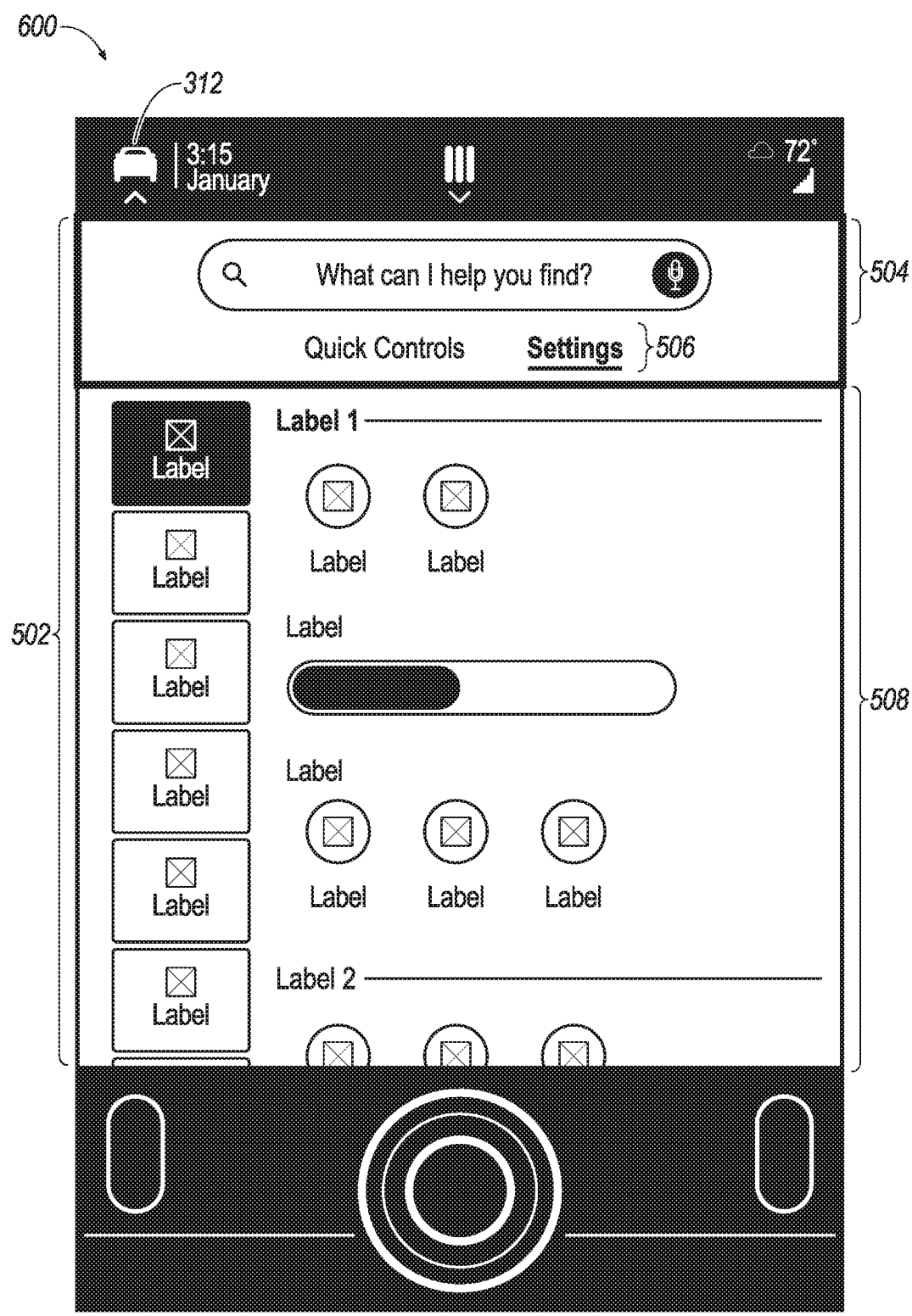
FIG. 6 illustrates an example user interface illustrating vehicle settings.

FIG. 6 illustrates an example user interface 600 illustrating vehicle settings. In an example, the user interface 600 is shown responsive to selection of settings from the quick controls/settings selector 506. As shown, the display section 508 now provides a listing of settings for the system to be reviewed and configured.

Figure 7A:
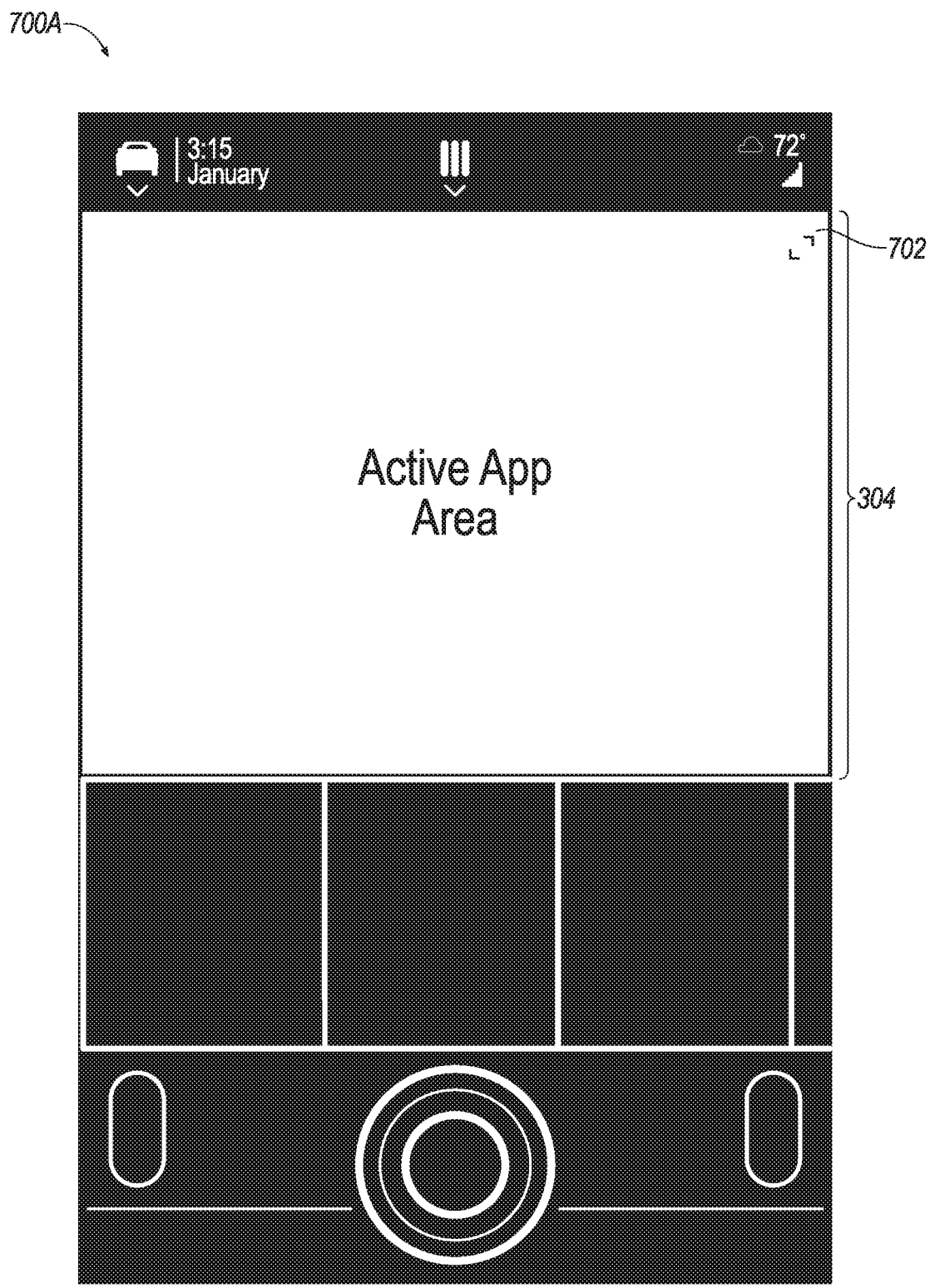
FIG. 7A illustrates an example user interface illustrating an active application area of a first size.
Figure 7B:
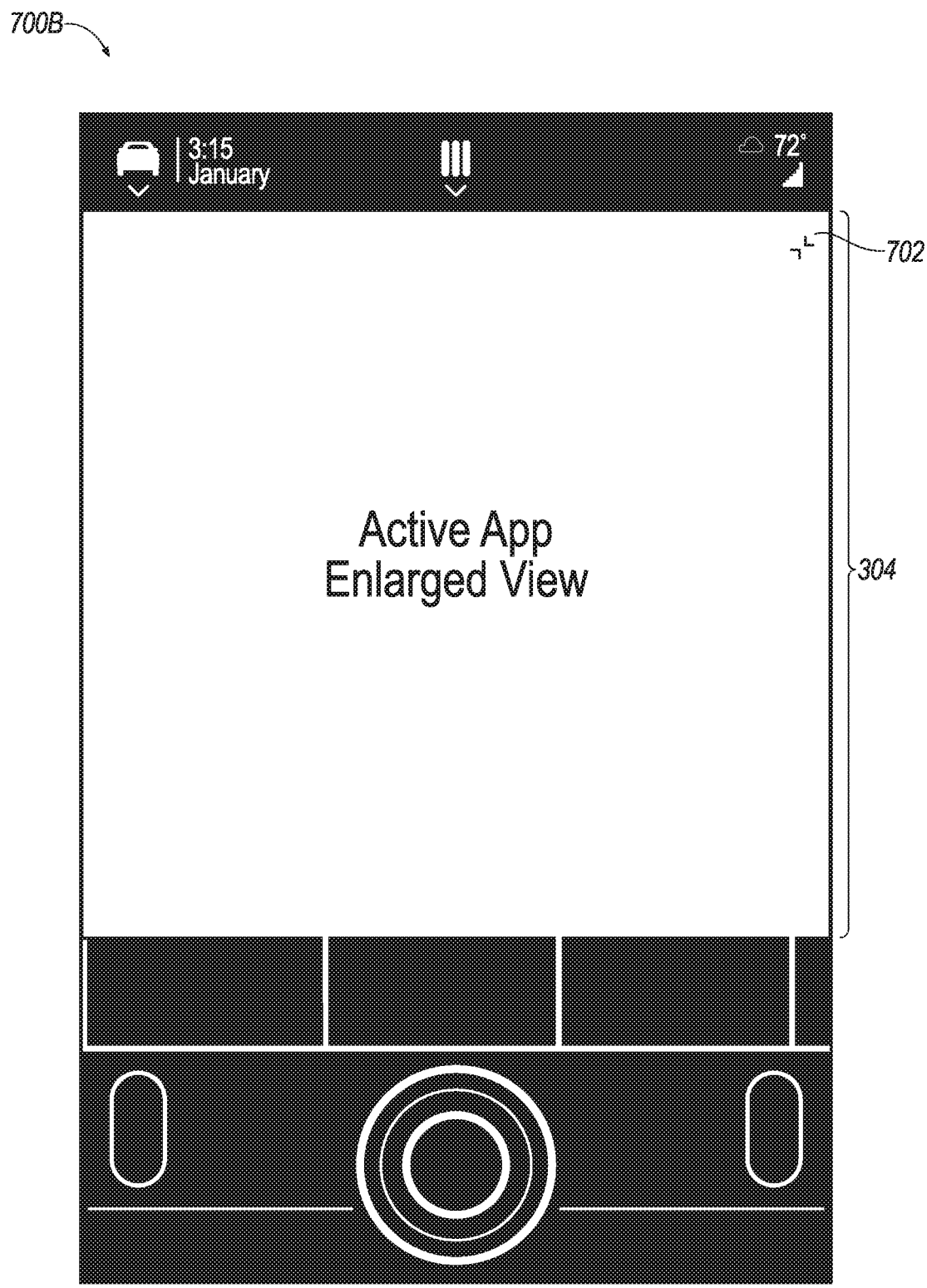
FIG. 7B illustrates an example user interface illustrating an active application area in a second size enlarged from the first size.

FIG. 7A illustrates an example user interface 700A illustrating an active application area 304 of a first size. FIG. 7B illustrates an example user interface 700B illustrating an active application area 304 in a second size enlarged from the first size. As shown in the user interfaces 700A and 700B, the active application area 304 includes a resize control 702 that, when selected toggles the size of the active application area 304 from the normal size as shown to an enlarged size having greater height. For instance, selection of the resize control 702 when in the normal size transitions the active application area 304 to the enlarged size, while selection of the resize control 702 when in the enlarged size transitions the active application area 304 to the normal size. Notably, when the active application area 304 is enlarged in height, the cards area 306 is reduced in height to accommodate the gain.

Figure 8:
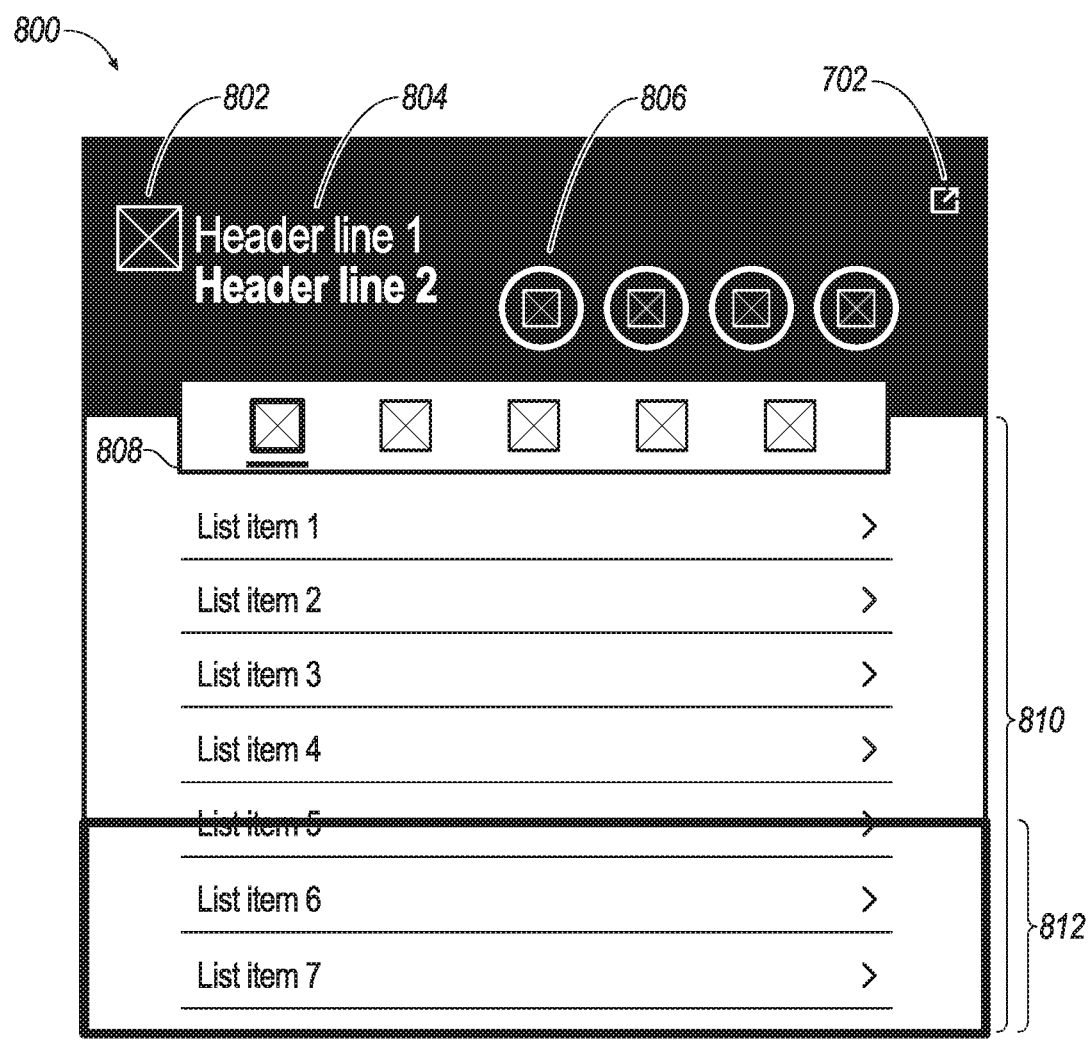
FIG. 8 illustrates an example user interface of the active application area displaying an application.

FIG. 8 illustrates an example user interface 800 of the active application area 304 displaying details of an activated application. The active application area 304 may be of a templated layout, having a set of data elements that are pre-designed to be safe for use by vehicle occupants, and also to support functionality useful for in-vehicle applications. As shown, the active application area 304 includes an icon 802, one or more headings 804 to indicate application information, one or more primary application function controls 806 to provide for selection of main application commands or the display of application information, an application menu bar 808 to provide for selection of menu items for the application, and an application details area 810 configured to display information specific to the active application. The elements 802, 804, 806, 808 may be templated fields that are configurable based on the active application being presented in the active application area 304. For example, each of the elements 802, 804, 806, 808 may be associated with predefined identifiers (e.g., strings, numbers, references to an object, etc.) that may be utilized by the application to specify content to be included in the respective elements.

The user interface 800 may also include the resize control 702 to allow the user to transition the active application area 304 from the normal size to the enlarged size. When in the enlarged size, the active application area 304 allow more space for information to be displayed in the application details area 810, as shown by additional height region 812. (It should be noted that the area 810 may also be also scrollable through swipe gestures or controls to reveal additional active app content.) However, this increase in height results in a decrease in height for the dash cards 308 (or in other examples, removal of the dash cards 308 from the display).

Figure 9A:
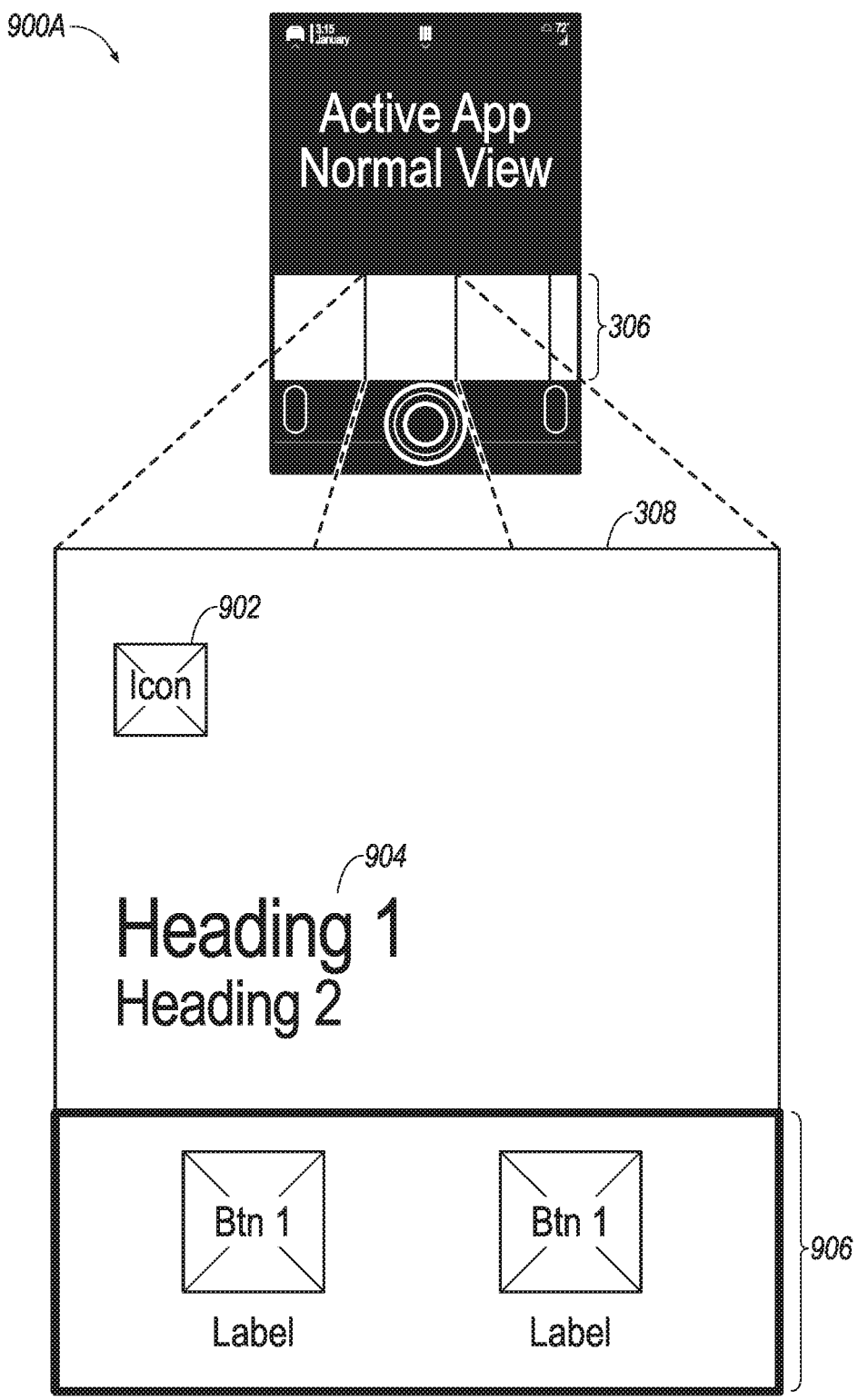
FIG. 9A illustrates an example detailed view of a dash card of a user interface for an active application area of the first size.
Figure 9B:
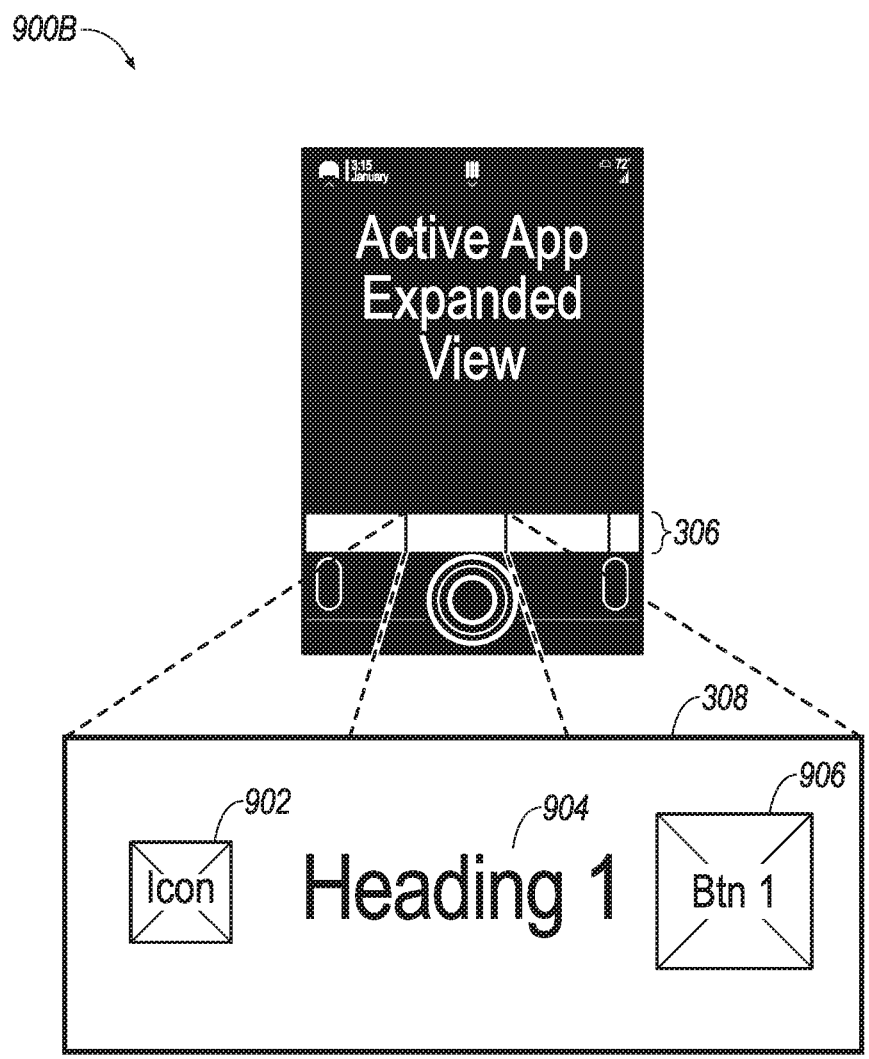
FIG. 9B illustrates an example detailed view of a dash card of a user interface for an active application area of the second size.

FIG. 9A illustrates an example detailed view of a dash card 308 of a user interface 900A for an active application area 304 of the first size. FIG. 9B illustrates an example detailed view of a dash card 308 of a user interface 900B for an active application area 304 of the second size. As shown in the user interface 900A, the dash card area 306 is taller when the active application area 304 is of the first size than when the active application area 304 is of the second size as shown in the user interface 900B.

Referring to the user interface 900A, the relatively taller view of the dash card area 306 may include dash cards 308 having an icon 902, one or more headings 904 to indicate application information, and one or more labeled buttons 906 or other action items to provide for selection of application commands or the display of application information. These elements 902, 904, 906 may be templated fields that are configurable based on the application being represented by the dash card 308. For example, each of the elements 902, 904, 906 may be associated with a predefined identifier (e.g., a string, an unsigned long, a reference to an object, etc.) that may be utilized by the application to specify content to be included in the respective element. Notably, this configuration of the templated fields may also include configurable removal of fields from the dash card 308, as all cards may not require all the elements to be displayed.

For instance, a media application may provide information in its dash card 308 including an icon 902 that indicates media playback, headings 904 that indicate information regarding a title and author of the content being played back, and one or more buttons 906 may include play, pause, or other controls useful for adjusting playback of the media. As another example, a phone application may provide information in its dash card 308 including an icon 902 of a phone, headings 904 that indicate the name of the phone (or a status of being on a call), and one or more buttons 906 to perform phone operations such as call back, voicemail, or view messages.

As shown in the user interface 900B, the dash card 308 is vertically-compressed as compared to the dash card 308 of the user interface 900A. These compressed cards may be referred to as "mini-cards." As shown, to provide for decreased height, the mini-cards include a horizontal layout of data items as opposed to a vertical layout, although that is just one possible way to reduce the overall height of the dash cards 308. (It should be noted that this is only an example, and that in horizontal dash card layouts the cars may have the same or different layouts.) Significantly, the compressed dash card 308 still includes an icon 902, a heading 904 (although possibly only one and not multiple as shown in the user interface 900A), and a labeled button 906 (although possibly only one and not multiple as shown in the user interface 900A). These elements 902, 904, 906 may again be templated fields that are configurable based on the application being represented by the dash card 308. Thus, the application itself may not require changes to support or even be aware of which size of dash cards 308 are presently being displayed.

Figure 10:
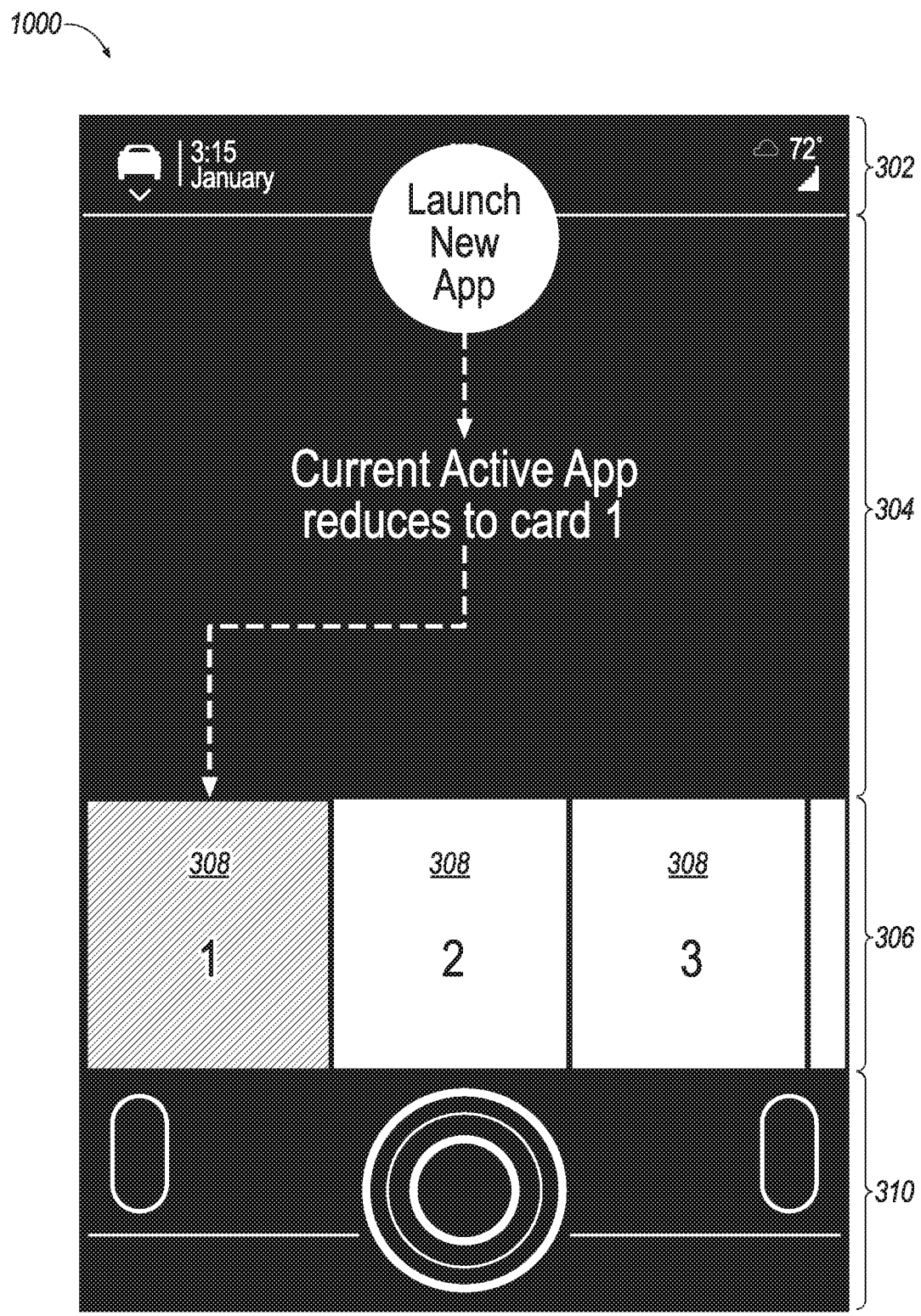
FIG. 10 illustrates an example user interface illustrating the minimization of an application from the active application area to the dash card area.

FIG. 10 illustrates an example user interface 1000 illustrating the minimization of an application from the active application area 304 to the dash card area 306. Dash cards 308 play a key role in creating a layout that is tailored to the user. Responsive to a new application being opened by a user, the formerly active application becomes minimized to a dash card 308 in a first slot in the dash card area 306. The remaining dash cards 308 are then shifted over one slot. If there are additional dash cards 308 beyond a predefined maximum amount, then the last dash card 308 may be closed. In one non-limiting example, the maximum amount of dash cards 308 is six.

Figure 11:
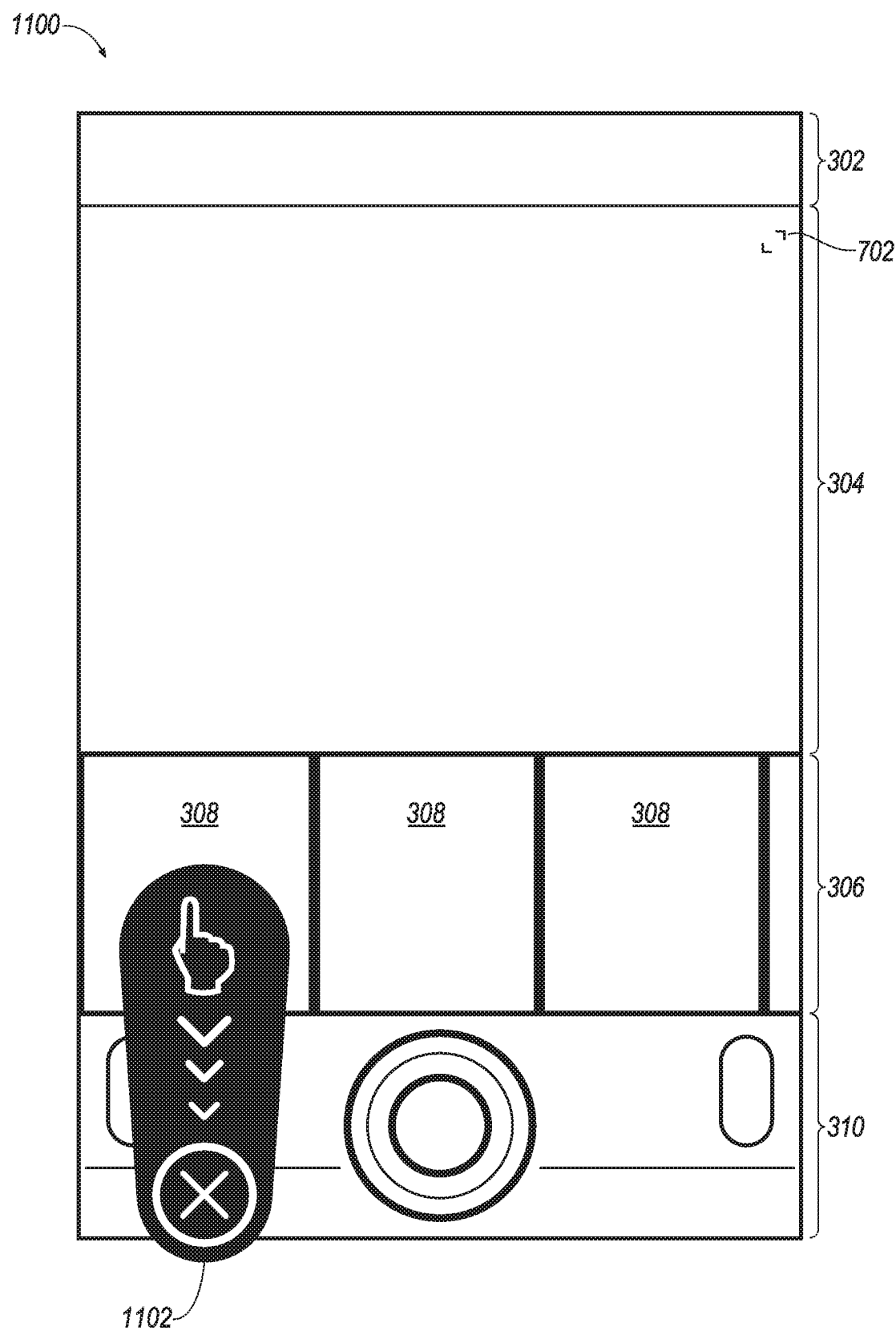
FIG. 11 illustrates an example user interface receiving a gesture to close an application.

FIG. 11 illustrates an example user interface 1100 receiving a gesture 1102 to close an application. As shown, the gesture 1102 includes a touch down of a finger to the display 114 on one of the dash cards 308, and a swipe away from the active application area 304. Responsive to receipt of the swipe action, the display application 132 closes the dash card 308, removing it from the dash card area 306. The remaining dash cards 308 accordingly move over to replace the hole in the dash card area 306. For instance, as shown the first dash card 308 is removed. Accordingly, the second through last dash cards 308 are shifted up to be the first through last dash cards 308.

Figure 12:
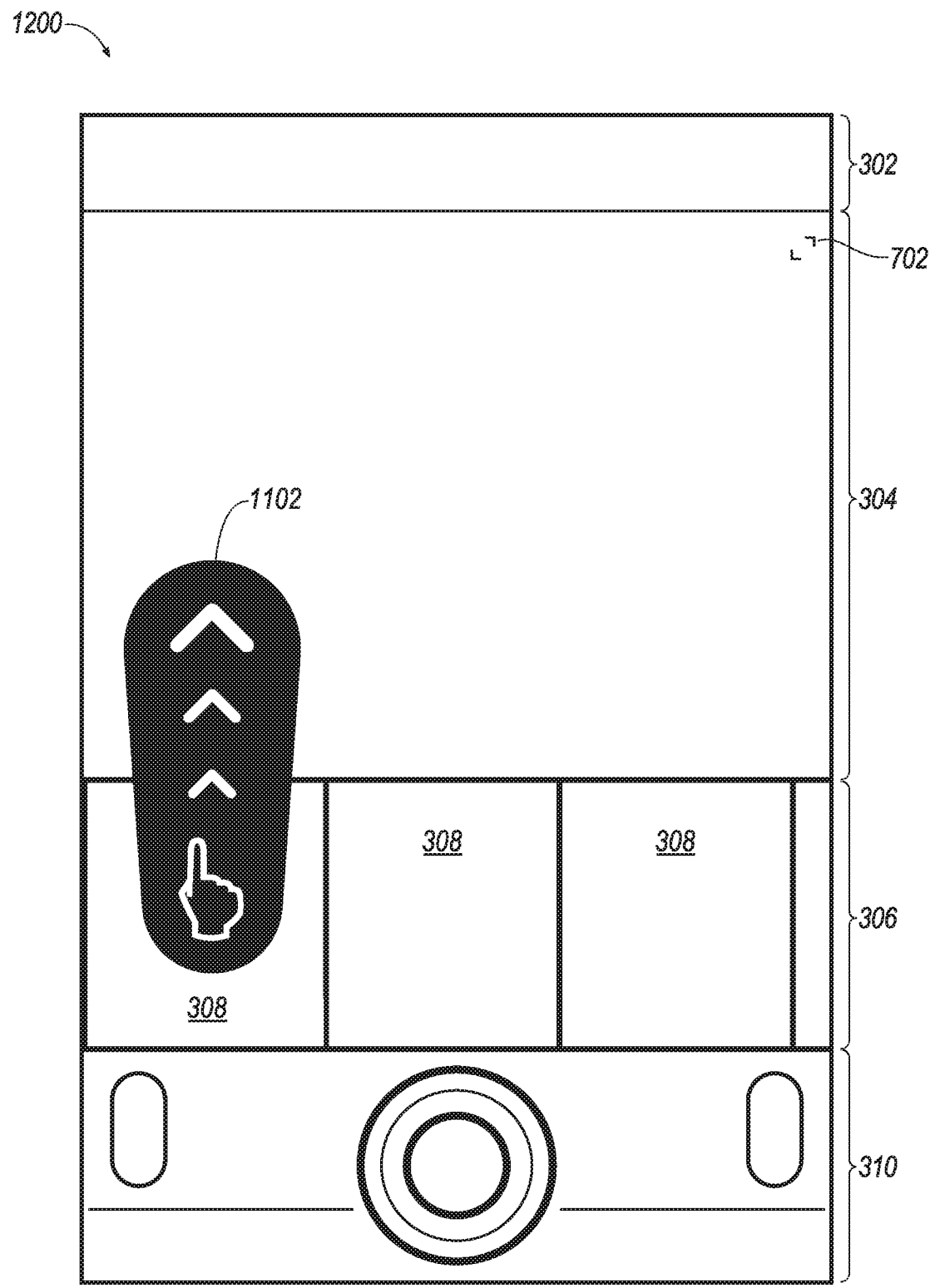
FIG. 12 illustrates an example user interface receiving a gesture to promote an application from a dash card to be the active application.

FIG. 12 illustrates an example user interface 1200 receiving a gesture 1202 to promote an application from a dash card 308 to be the active application. As shown, the gesture 1202 includes a touch down of a finger to the display 114 on one of the dash cards 308, and a swipe towards the active application area 304. Responsive to receipt of the swipe action, the display application 132 activates the application of the selected dash cards 308 as the application to be displayed in the active application area 304. Notably, the application previously having been displayed in the active application area 304 may be minimized into a dash card 308 as discussed above with respect to the user interface 1000. For instance, the current active application may become the dash card at the first location, and the remaining dash cards may accordingly move over to replace the hole in the dash card area 306.

Figure 13:
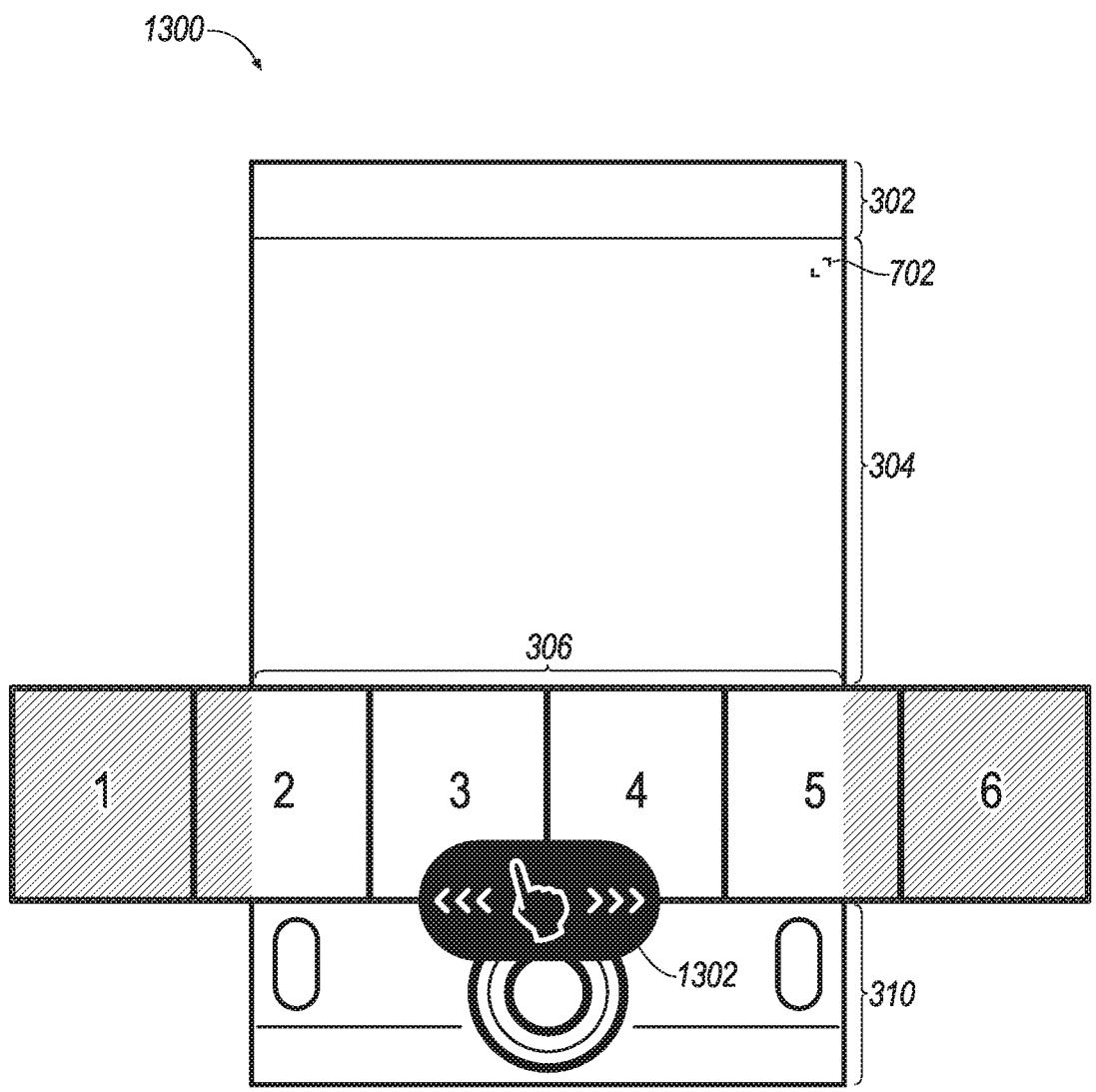
FIG. 13 illustrates an example user interface receiving a gesture to browse through the dash cards of the dash card area.

FIG. 13 illustrates an example user interface 1300 receiving a gesture 1302 to browse through the dash cards 308 of the dash card area 306. As shown, the gesture 1302 includes a touch down of a finger to the display 114 within the dash card area 306, and movement left or right to scroll through the dash cards 308. By scrolling, a user may be able to browse through more dash cards 308 than may be displayable within the dash card area 306 at one time. For instance, the user may scroll to a dash card 308, and may tap (e.g., touch down) or swipe towards the active application to promote the application of the selected dash card 308 to be the active application.

Figure 14:
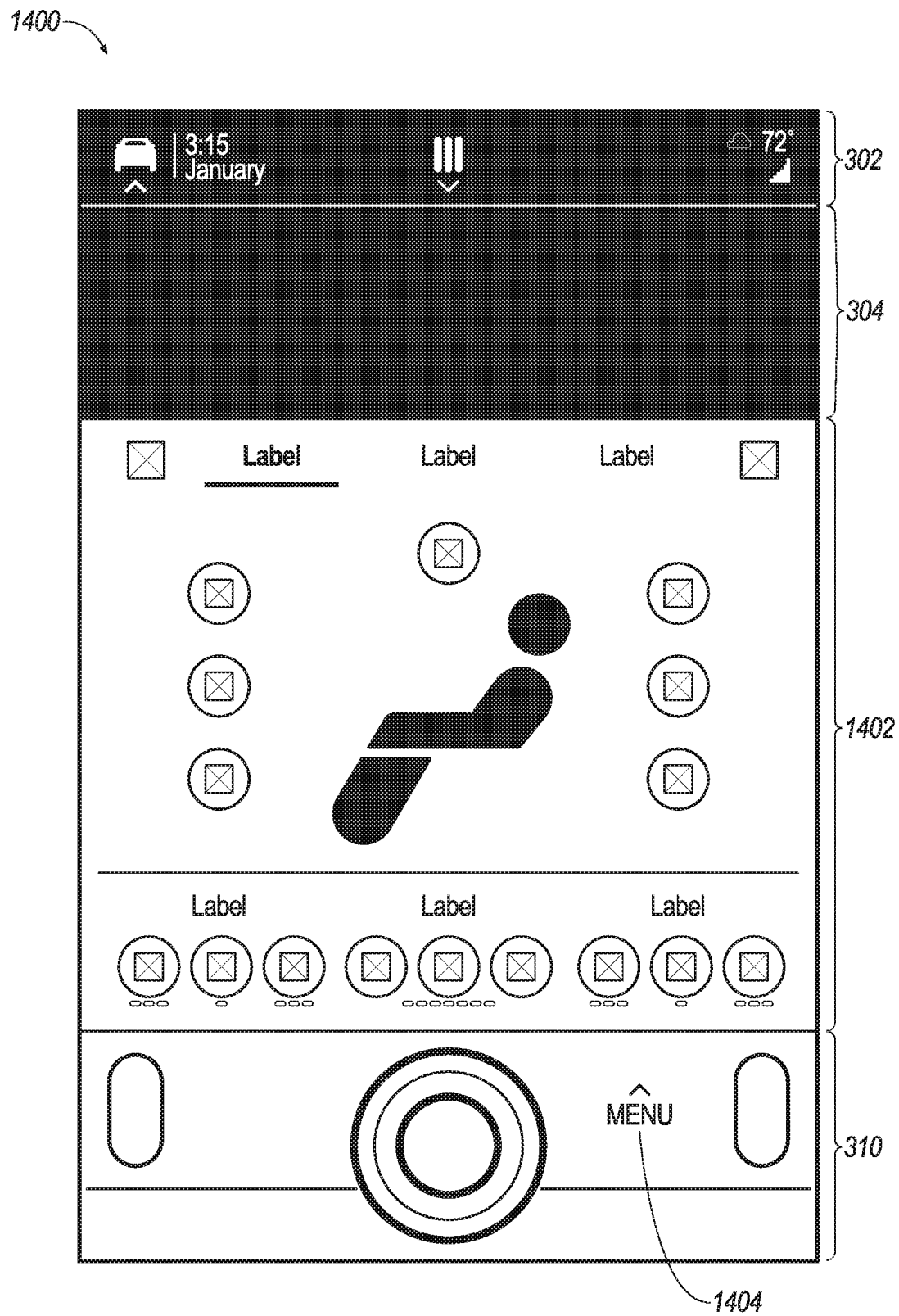
FIG. 14 illustrates an example user interface illustrating a climate control drawer.

FIG. 14 illustrates an example user interface 1400 illustrating a climate control drawer 1402. As mentioned above, the climate area 310 may provide persistent screen space for primary climate controls. However, the climate control drawer 1402 may be expanded to give the user access to all vehicle climate controls. In an example, the climate control drawer 1402 may be provided as an overlay over the other user interface elements responsive to user selection of a menu control 1404 within the climate area 310.

Figure 15:
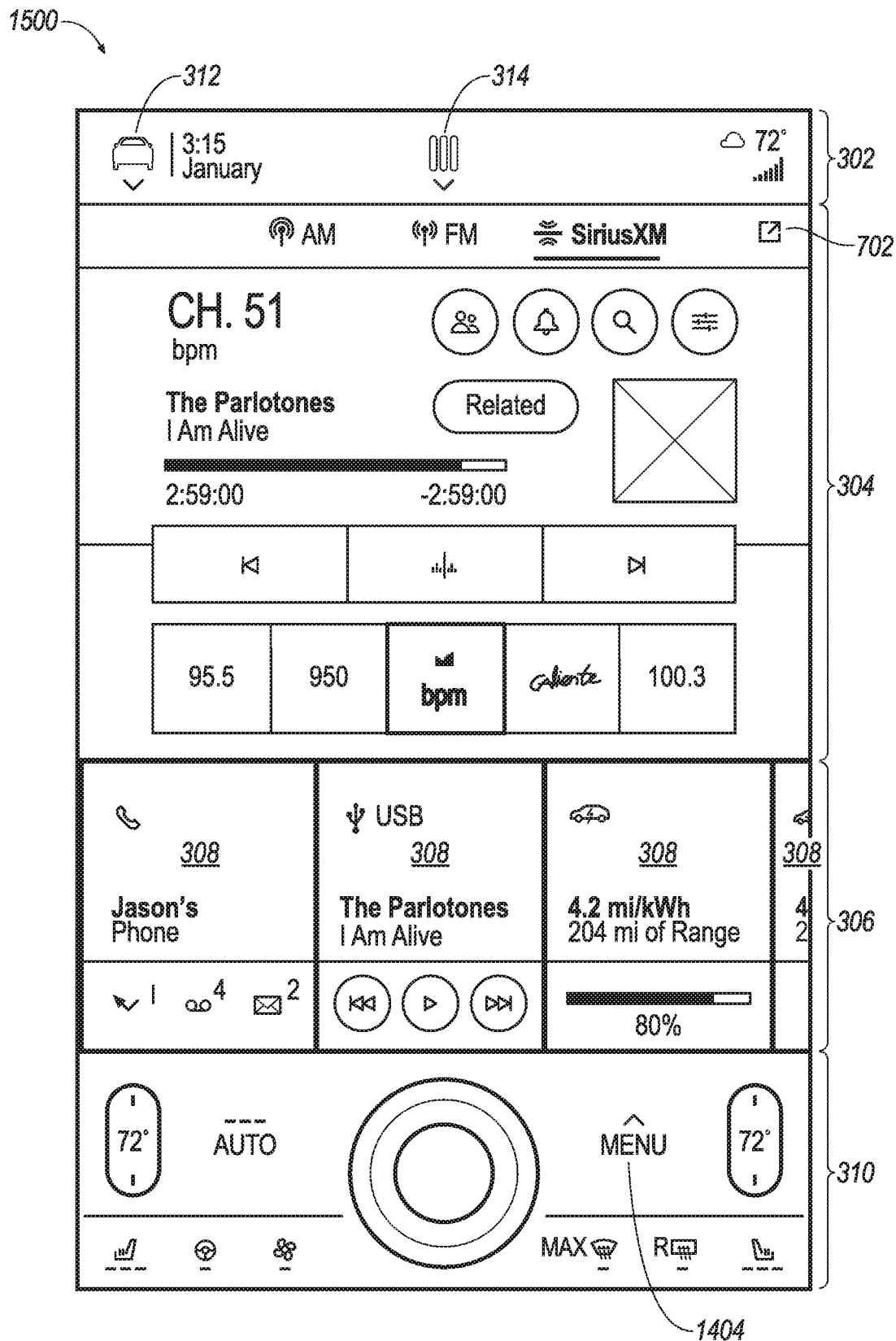
FIG. 15 illustrates an example user interface illustrating details of a radio application.

FIG. 15 illustrates an example user interface 1500 illustrating details of a radio application. As shown, the radio application is included in the active application area 304.

Additionally, the first dash card 308 includes a minimized view of a phone application, the second dash card 308 includes a minimized version of the media playback application, and the third dash card 308 includes a minimized version of a vehicle efficiency/range application.

Figure 16:
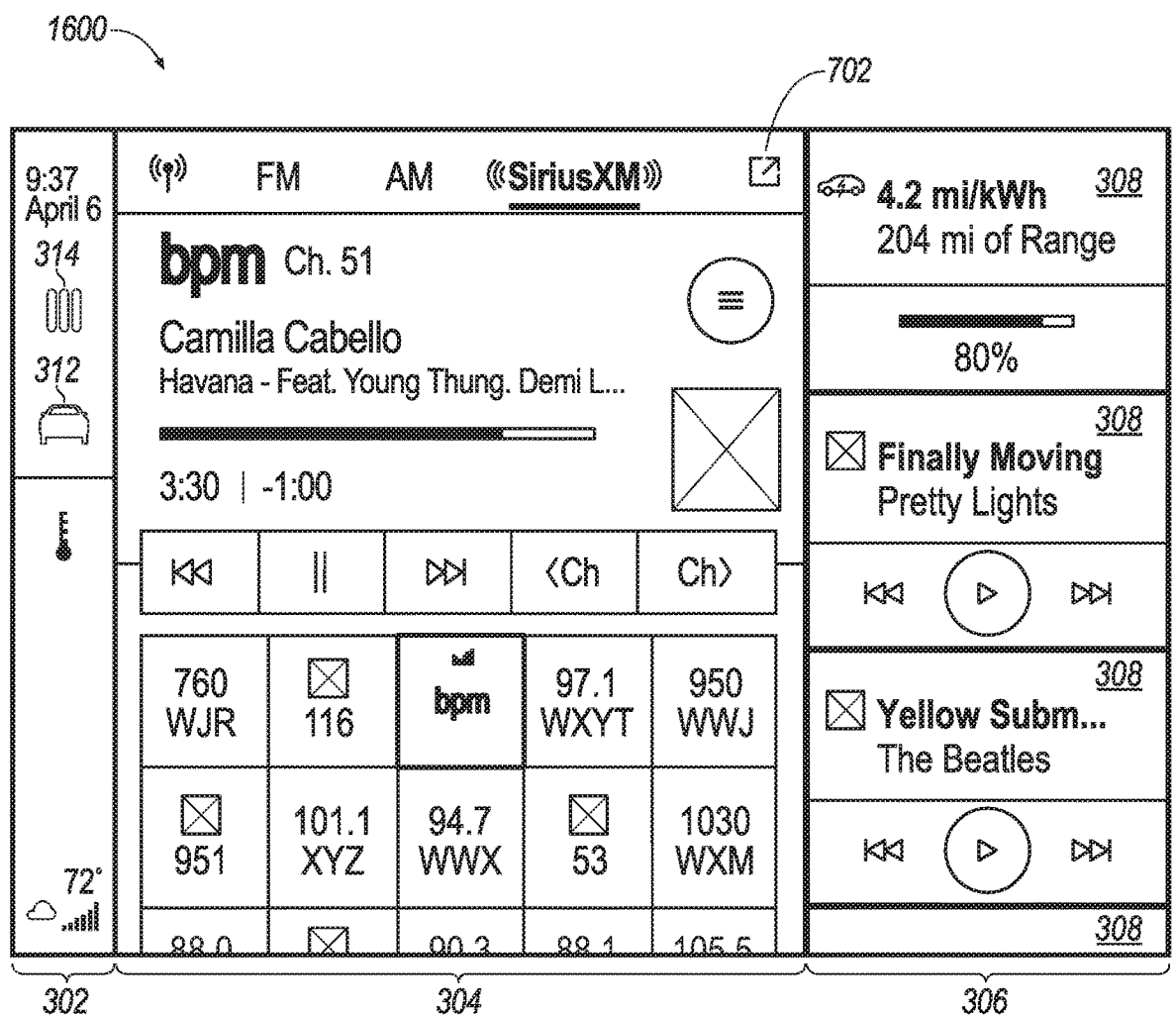
FIG. 16 illustrates an example user interface illustrating details of the radio application in a horizontal layout.

FIG. 16 illustrates an example user interface 1600 illustrating details of the media playback application in a horizontal layout. As compared to the example vertical layout shown in the user interface 1500, in the horizontal layout shown in the user interface 1600 the status bar area 302, active application area 304, and cards area 306 are oriented left to right as opposed to top to bottom. Moreover, the climate area 310 is not shown. It should be noted that this is merely an example, and horizontal layouts including the climate area 310. Additionally, in other examples the horizontal user interface may include a different ordering or layout of these and other user interface elements. As shown, a radio application is again included in the active application area 304. Additionally, the first dash card 308 includes a minimized view of a vehicle efficiency/range application, the second dash card 308 includes a minimized version of a streaming music application, and the third dash card 308 includes a minimized version of another streaming music application. The user interface 1600 also includes the resize control 702 to allow the user to transition the active application area 304 from the normal size to the enlarged size.

Figure 17:
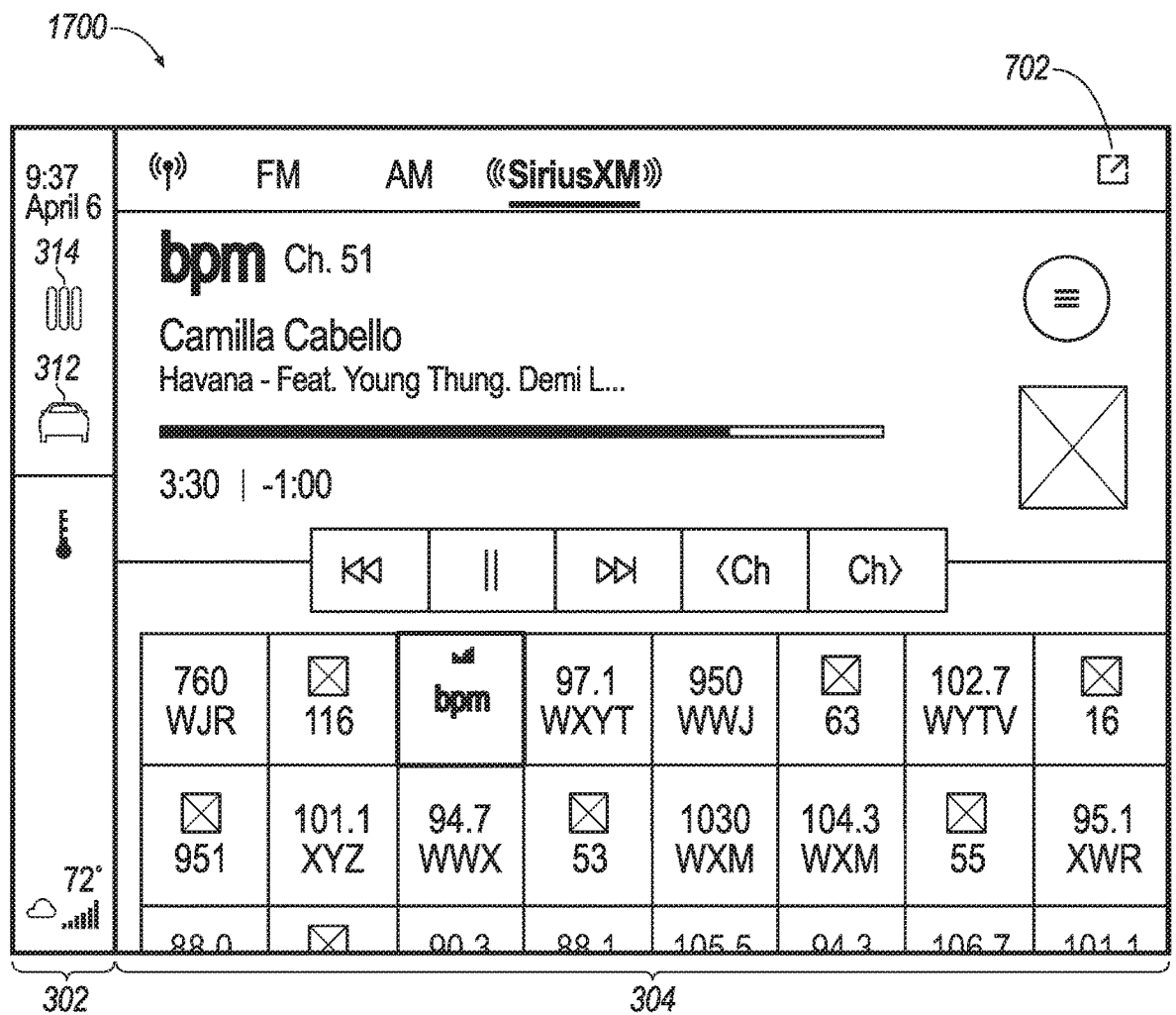
FIG. 17 illustrates an example user interface illustrating details of the radio application in a horizontal layout with an enlarged active application area.

FIG. 17 illustrates an example user interface 1700 illustrating details of the media playback application in a horizontal layout with an enlarged active application area 304. In an example, the user interface 1700 may be presented responsive to user selection of the resize control 702 from the user interface 1600. As shown, the enlarged active application area 304 is extended horizontally to give greater width for content to the active application area 304. Additionally, the dash card area 306 is hidden to provide for the additional width. It should be noted that this is but one example of an enlarged active application area 304, and in other examples the dash card area 306 may be reduced in width but stay present in the user interface 1700.

Figure 18:
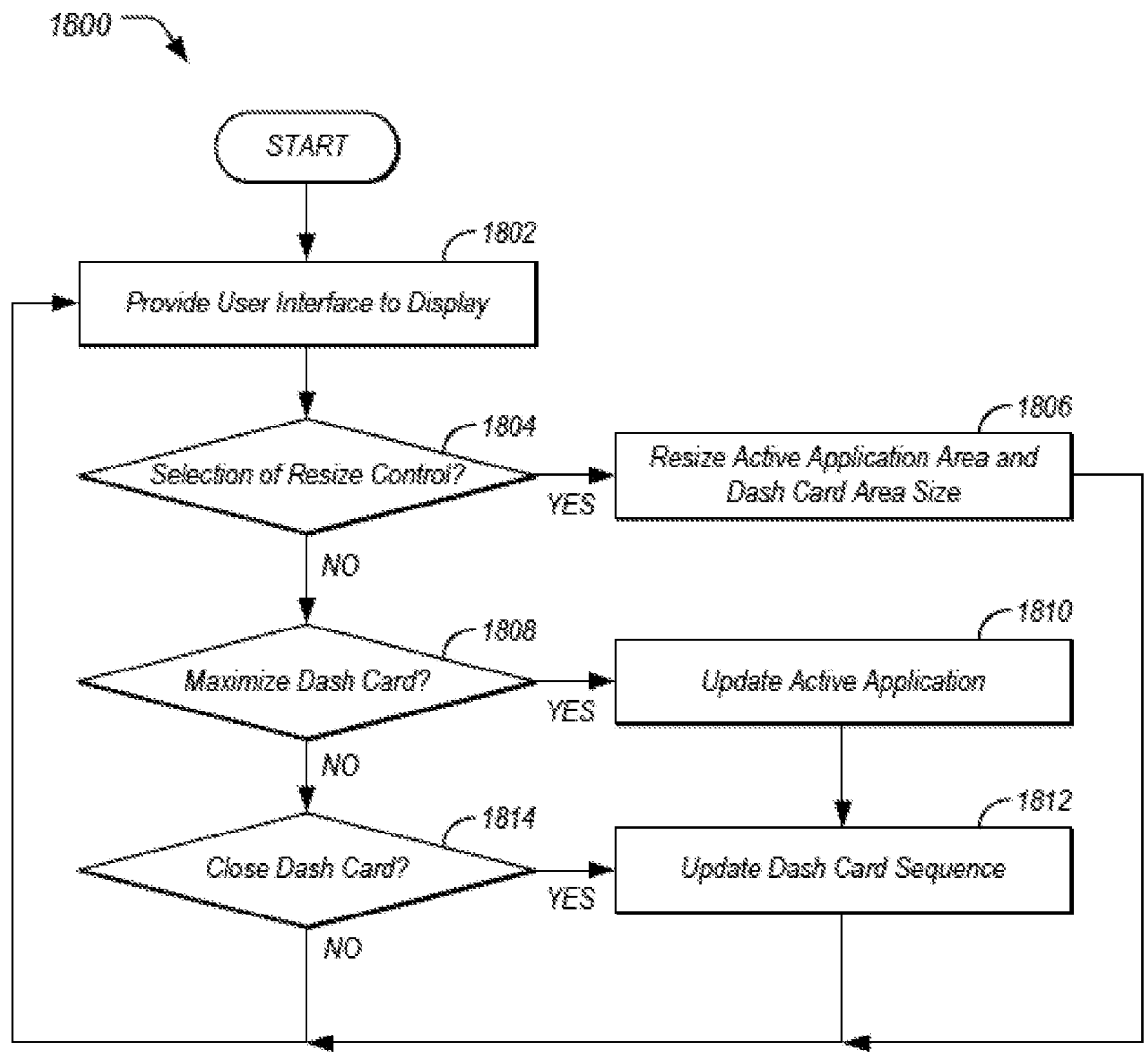
FIG. 18 illustrates an example process for the use of display cards in a user interface of a vehicle.

FIG. 18 illustrates an example process 1800 for the use of display cards 308 in a user interface of a vehicle 102. In an example, the process 1800 may be performed by the information display system 104 of the system 100 discussed in detail above.

At operation 1802, the information display system 104 provides a user interface to the display 114. In an example, the display controller 118 of the information display system 104 provides signals to drive the display 114 under the direction of the display application 132 executed by the processor 106 of the information display system 104. Examples of such user interfaces are discussed above with respect to FIGS. 3-14.

At 1804, the information display system 104 determines whether the resize control 702 of the user interface was selected. In an example, the information display system 104 may receive input from one or more HMI controls 116, such as touch input to the display 114, indicating user selection of the resize control 702. If such input is received, control passes to operation 1806.

The information display system 104 toggles the size of the active application area 304 and the dash card area 306 at 1806. In an example, responsive to a first selection of the resize control 702, the information display system 104 increases height (or width) of the active application area 304 by a height (or width) amount and decreases height (or width) of the dash card area 306 by the height (or width) amount; and responsive to a second selection of the resize control 702, the information display system 104 decreases the height (or width) of the active application area 304 by the height (or width) amount and increases height (or width) of the dash card area 306 by the height (or width) amount. In another example, the information display system 104 may have three (or more) sizes of the active application area 304 and the dash card area 306 and may cycle through the three (or more) sizes. It should be noted that in some examples, the dash card area 306 may be hidden in one or more of the sizes, as opposed to reduced in size. After operation 1806, control passes to operation 1802.

At operation 1808, the information display system 104 determines whether a dash card 308 was maximized. In an example, the information display system 104 may receive input from one or more HMI controls 116, such as touch input to the display 114. For instance, the touch input may include a gesture 1202 formed by a touch down of a finger to the display 114 on one of the dash cards 308, and a swipe upward towards the active application area 304. If such input is received, control passes to operation 1810. Otherwise, control passes to operation 1814.

The information display system 104 updates the active application at 1810. In an example, responsive to receipt of the swipe action, the display application 132 activates the application of the selected dash cards 308 as the application to be displayed in the active application area 304. After 1810, control passes to operation 1812.

At 1812, the information display system 104 updates the sequence of the dash cards 308 in the dash card area 306. In an example, responsive to a new application being opened by a user, the formerly active application becomes minimized to a dash card 308 in a first slot in the dash card area 306. The remaining dash cards 308 are then shifted over one slot. If there are additional dash cards 308 beyond a predefined maximum amount, then the last dash card 308 may be closed. In another example, responsive to a gesture to close a dash card 308, the display application 132 removes it from the dash card area 306. The remaining dash cards 308 are accordingly moved over to replace the hole in the dash card area 306.

At operation 1814, the information display system 104 determines whether a dash card 308 was closed. In an example, the information display system 104 may receive input from one or more HMI controls 116, such as touch input to the display 114. For instance, the touch input may include a gesture 1202 formed by a touch down of a finger to the display 114 on one of the dash cards 308, and a swipe downward away from the active application area 304. If such input is received, control passes to operation 1812. Otherwise, control passes to operation 1802.

Computing devices described herein, such as the information display system 104, generally include computer-executable instructions where the instructions may be executable by one or more computing devices such as those listed above. Computer-executable instructions, such as those of the display application 132 may be compiled or interpreted from computer programs created using a variety of programming languages and/or technologies, including, without limitation, and either alone or in combination, HTML 5, JAVA™, C, C++, C#, VISUAL BASIC, JAVASCRIPT, PYTHON, JAVASCRIPT, PERL, PL/SQL, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for configuration of vehicle applications comprising:
   a display; and
   a processor programmed to
   provide, to the display, a user interface including an active application area configured to display an active application, and a dash card area adjacent to and nonoverlapping the application area configured to display one or more dash cards, each dash card representative of a minimized application,
   responsive to a first selection of a resize control located at a predefined position within the active application area external to the dash card area, increase a dimension of the active application area from a first extent to a second extent and decrease a dimension of the dash card area from a third extent to a fourth extent, and
   responsive to a second selection of the resize control, decrease the dimension of the active application area from the second extent to the first extent and increase the dimension of the dash card area from the fourth extent to the third extent,
   wherein the first and third extents are non-zero, the second extent is greater than the first extent, and the fourth extent is less than the third extent, and the resize control is displayed at a predefined fixed location within the active application area regardless of the dimension of the active application area and the dimension of the dash card area, and
   wherein the resize control is displayed as a first icon when the dimension of the active application area is at the first extent, and the resize control is displayed as a second icon when the dimension of the active application area is at the second extent, wherein the first icon and the second icon are different icons.

2. The system of claim 1, wherein the processor is further programmed to, responsive to receipt of swipe gesture input applied to a dash card representing an application in a direction from the dash card area toward the application area, promote the application to be the active application displayed in the application area.

3. The system of claim 1, wherein the processor is further programmed to, responsive to a change in which application is the active application, minimize a current active application to a first dash card of the one or more dash cards and shift any existing dash cards to subsequent dash cards of the one or more dash cards.

4. The system of claim 1, wherein the one or more dash cards includes up to a predefined maximum number of dash cards.

5. The system of claim 1, wherein the processor is further programmed to, responsive to receipt of swipe gesture input applied to a dash card representing an application in a direction from the dash card area away from the application area, remove the application from the dash card area.

6. The system of claim 1, wherein the processor is programmed to provide, to the display, in the user interface, a status bar area adjacent to the application area configured to provide access to features and settings of the user interface and a climate area adjacent to the dash card area configured to provide persistent screen space for primary climate controls.

7. The system of claim 6, wherein the processor is further programmed to, responsive to selection of a menu control in the climate area, display an overlay including additional climate controls in addition to the primary climate controls.

8. The system of claim 6, wherein the processor is further programmed to, display the one or more dash cards in a first format including a first set of information when the dimension of the dash card area is increased, and display the one or more dash cards in a second format including a second set of information when the dimension of the dash card area is decreased, wherein the first set of information includes a superset of the information as compared to that displayed in the second set of information.

9. The system of claim 1, wherein the predefined fixed location is the upper right corner of the active application area.

10. The system of claim 1, wherein the processor is further programmed to display the one or more dash cards in a vertical layout of data items when the dimension of the dash card area is increased, and display the one or more dash cards in a horizontal layout of data items when the dimension of the dash card area is decreased.

11. A method comprising:
responsive to a first selection of a resize control, increasing a non-zero dimension of an active application area configured to display an active application by an amount and decreasing a non-zero dimension of a dash card area adjacent to and nonoverlapping the application area configured to display a sequence of dash cards each representative of a minimized application by the amount, the resize control being located at a predefined position within the active application area external to the dash card area;
responsive to a second selection of the resize control, decreasing the non-zero dimension of the active application area by the amount and increasing the non-zero dimension of the dash card area by the amount,
wherein the resize control is displayed at a predefined fixed location within the active application area regardless of the dimension of the active application area and the dimension of the dash card area, and
wherein the resize control is displayed as a first icon when the dimension of the active application area is at the first extent, and the resize control is displayed as a second icon when the dimension of the active application area is at the second extent, wherein the first icon and the second icon are different icons.

12. The method of claim 11, further comprising, responsive to receipt of swipe gesture input in a direction toward the application area applied to a dash card representing an application, promoting the application to be the active application displayed in the application area.

13. The method of claim 11, further comprising, responsive to a change in which application is the active application, minimizing a current active application to a first dash card of the sequence of dash cards, and shifting any existing dash cards in the sequence of dash cards to subsequent dash cards of the sequence of dash cards.

14. The method of claim 11, further comprising, responsive to receipt of swipe gesture input in a direction away from the application area applied to a dash card representing an application, removing the application from the dash card area.

15. The method of claim 11, further comprising providing, to the display, a status bar area adjacent to the application area configured to provide access to features and settings.

16. The method of claim 11, further comprising providing, to the display, a climate area adjacent to the dash card area configured to provide persistent screen space for primary climate controls; and
responsive to selection of a menu control in the climate area, displaying an overlay including additional climate controls in addition to the primary climate controls.

17. The method of claim 11, further comprising:
displaying the sequence of dash cards in a first format including a first set of information when the dimension of the dash card area is increased by the amount; and
displaying the sequence of dash cards in a second format including a second set of information when the dimension of the dash card area is decreased by the amount, wherein the first set of information includes a superset of the information displayed in the second set of information.

18. A non-transitory computer-readable medium comprising instructions that, when executed by a processor of an information display system, cause the information display system to:
display an active application area showing an active application and a dash card area below the application area, the active application area and the dash card area being adjacent nonoverlapping, and non-zero in height, the active application area and the dash card area sharing a horizontal boundary dividing a lower extent of the active application area from an upper extent of the dash card area, the dash card area configured to display a sequence of dash cards each representative of a minimized application;
responsive to a first selection of a resize control located at a predefined position within the active application area external to the dash card area, move the horizontal boundary vertically downward to increase height of the active application area by a height amount and decrease height of the dash card area by the height amount; and
responsive to a second selection of the resize control, move the horizontal boundary vertically upward to decrease height of the active application area by the height amount and increase height of the dash card area by the height amount,
wherein the resize control is displayed at a predefined fixed location within the active application area regardless of the height of the active application area and the height of the dash card area, and
wherein the resize control is displayed as a first icon when the dimension of the active application area is at the first extent, and the resize control is displayed as a second icon when the dimension of the active application area is at the second extent, wherein the first icon and the second icon are different icons.

19. The medium of claim 18, further comprising instructions that, when executed by the processor of an information display system, cause the information display system to, responsive to receipt of swipe gesture input in a direction toward the application area applied to a dash card representing an application, promote the application to be the active application displayed in the application area.

20. The medium of claim 18, further comprising instructions that, when executed by the processor of an information display system, cause the information display system to, responsive to a change in which application is the active application, minimize a current active application to a first dash card of the sequence of dash cards, and shift any existing dash cards in the sequence of dash cards to subsequent dash cards of the sequence of dash cards.

21. The medium of claim 18, further comprising instructions that, when executed by the processor of an information display system, cause the information display system to, responsive to receipt of swipe gesture input in a direction away from the application area applied to a dash card representing an application, remove the application from the dash card area.

22. The medium of claim 18, further comprising instructions that, when executed by the processor of an information display system, cause the information display system to display a status bar area adjacent to the application area configured to provide access to features and settings.

23. The medium of claim 18, further comprising instructions that, when executed by the processor of an information display system, cause the information display system to:
   display a climate area adjacent to the dash card area configured to provide persistent screen space for primary climate controls; and
   responsive to selection of a menu control in the climate area, display an overlay including additional climate controls in addition to the primary climate controls.

24. The medium of claim 18, further comprising instructions that, when executed by the processor of an information display system, cause the information display system to:
   display the sequence of dash cards in a first format including a first set of information when the height of the dash card area is increased by the height amount; and
   display the sequence of dash cards in a second format including a second set of information when the height of the dash card area is decreased by the height amount,
   wherein the first set of information includes a superset of the information displayed in the second set of information.

* * * * *